United States Patent [19]
Hanamoto et al.

[11] Patent Number: 6,071,456
[45] Date of Patent: Jun. 6, 2000

[54] PROCESS FOR EFFECTING INJECTION-MOLDED-IN DECORATION

[75] Inventors: Keiji Hanamoto; Takeshi Matano; Kazuhisa Kobayashi; Masayuki Shibata; Hiroyuki Atake, all of Tokyo-to, Japan

[73] Assignee: Dai Nippon Printing Co., Ltd., Japan

[21] Appl. No.: 08/617,888

[22] PCT Filed: Jul. 28, 1995

[86] PCT No.: PCT/JP95/01509

§ 371 Date: May 15, 1996

§ 102(e) Date: May 15, 1996

[87] PCT Pub. No.: WO96/03268

PCT Pub. Date: Feb. 8, 1996

[30] Foreign Application Priority Data

Jul. 28, 1994 [JP] Japan ................................... 6-176749

[51] Int. Cl.[7] ................................................... B29C 45/14
[52] U.S. Cl. ........................ 264/265; 264/511; 264/513; 264/267; 264/269; 425/112; 425/127; 425/388
[58] Field of Search .................................. 264/511, 265, 264/266, 513, 553, 554, 548, 267; 425/388, 112, 127

[56] References Cited

U.S. PATENT DOCUMENTS 4,048,781 9/1977 Johansen ................................. 264/551
5,188,787 2/1993 King et al. ............................... 264/511

FOREIGN PATENT DOCUMENTS

| 62-26576 | 4/1987 | Japan . |
| 5-77271 | 3/1993 | Japan . |
| 5-220781 | 8/1993 | Japan . |
| 5-278065 | 10/1993 | Japan . |
| 07227877 | 8/1995 | Japan . |

Primary Examiner—Jan H. Silbaugh
Assistant Examiner—Edmund H. Lee
Attorney, Agent, or Firm—Parkhurst & Wendel, L.L.P.

[57] ABSTRACT

A decoration sheet is retained on the cavity periphery by a sheet clamp in such a state that it is projected into a molding cavity of a female die. Then the decoration sheet is heated and softened by a curved hot platen, and thereafter it is drawn through suction ports of the female die to bring the sheet into close fit to the inner periphery of the molding cavity. The deformation amount of the decoration sheet heated and softened is decreased in premolding the sheet into the molding cavity surface of the female die. Therefore, distortion of the decoration sheet, appearance of wrinkles, and breakage thereof become little. Next, the female die and the male die are coupled with each other to effect die clamping, and a molten resin is poured to fill the molding cavity to effect injection molding.

1 Claim, 34 Drawing Sheets

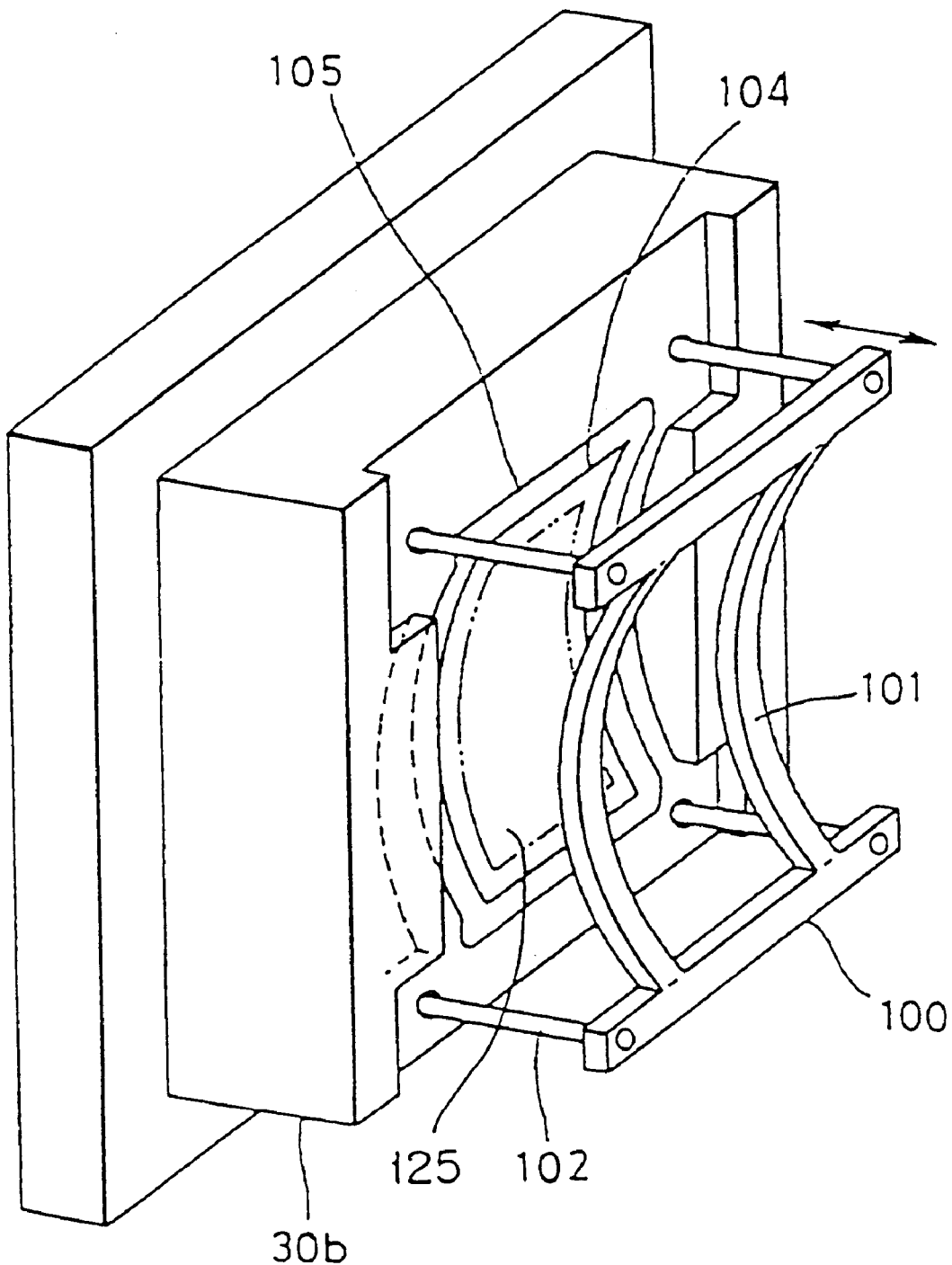
F I G. 14

6,071,456

PROCESS FOR EFFECTING INJECTION-MOLDED-IN DECORATION

TECHNICAL FIELD

The present invention relates to a process and an apparatus for effecting injection-molded-in foil decoration, by which foil decoration is effected on a surface of a molded body at the same time as injection molding thereof, and particularly, to a process and apparatus suitably applicable to effecting foil decoration properly on the surface of the molded body having relatively large curvature or level differences of surface.

BACKGROUND ART

Foil decoration is utilized so as to be effected on the surface of the molded body at the same time as injection molding of the resin molded body, thereby producing, for example, the molded article 13 as shown in FIG. 44, on the surface of which a pattern 11 and letters 12 are formed. A molding apparatus 10 as shown in FIG. 45 is used for the injection-molded-in foil decoration. (See the bulletins of Japanese Laid-open Patent Application No. 59-31130 and Japanese Patent Publication No. 4-42172.)

This apparatus 10 is provided with a female die 20 and a male die 25 arranged to be opposed to the female die 20. The female die 20 has a molding cavity 21 corresponding to the contour of the molded body to be obtained and suction ports 22 passing through the inside to open to the cavity 21, and is arranged to be translated in approaching-leaving directions relative to the male die 25 by a translating unit 23 composed of a cylinder, etc. Further, the male die 25 has a core 26, which is to be inserted into the cavity 21, and a pouring port (gate) 27 of a molten-resin-injecting unit is formed therein. Further, a hot platen 29 is arranged as movable into or away from between the female die 20 and the male die 25. This hot platen 29 includes its front surface (on the female die 20 side) as a heating surface.

In order to effect foil decoration at the same time as injection molding using such an apparatus 10, a decoration sheet 15 is first set to be opposed to the molding cavity of female die 20, and the decoration sheet 15 is heated to soften by the hot platen 29 (FIG. 45). Then the decoration sheet 15 is pinched between the female die 20 and the hot platen 29 so as to close an opening face of the cavity 21, the cavity is evacuated through the suction ports 22 formed in the female die 20, and compressed air is supplied through an air vent (not shown) provided in the hot platen 29 as occasion demands.

It makes the decoration sheet 15 stretched along the inner periphery of cavity 21 as adhering thereto in fit, as shown in FIG. 46. Here, this step is generally called as premolding.

Next, after the hot platen 29 is withdrawn from between the both dies, as shown in FIG. 47, the female die 20 is advanced to be coupled with the male die 25, thereby effecting clamping of the dies. Thereafter, into a cavity space formed between the female die 20 and the male die 25, a molten resin is poured and charged through the pouring port 27 of the injecting unit provided in the male die 25, thereby effecting injection molding.

Thus, the decoration sheet 15 in the female die 25 becomes integrated with the resin injected (molded body P) to adhere thereto. When the dies are opened after completion of injection molding, the molded body can be taken out of the dies as the decoration sheet is adhered to the outer surface.

Here, if the decoration sheet 15 is a bonded and layered film (laminate film), the foil decoration is completed at that stage, and all layers of the decoration sheet 15 are adhered to integrate onto the outer surface of the molded body P to form a decorative layer. On the other hand, if the decoration sheet 15 is a transfer film, only a base film of the decoration sheet 15 integrated onto the outer surface of the molded body P is released in a later step, so that a transfer layer such as a pattern layer is left on the molded body P side to form a decorative layer, thereby completing the foil decoration.

Since in the conventional processes for effecting injection-molded-in foil decoration the decoration sheet is set on the opening surface side of the molding cavity in the female die and then is pushed into the molding cavity by evacuation or by the core member, whereby the sheet is drawn toward the cavity inner periphery (cavity surface) at a stretch in a short period of time to become laid along it, the decoration sheet has to be stretched at high speed in the mold cavity. Stretching amounts of the decoration sheet in the dies become larger as the level difference or curvature of the surface of molded body becomes greater. Further, if the sheet is stretched at high speed, distribution of stresses cannot be sufficiently dispersed or relaxed, which causes the stretching amounts to be concentrated locally. When the decoration sheet is locally stretched to a large extent, the pattern layer or the like formed thereon is naturally stretched as well, which could result in distorting the pattern layer to an unignorable extent or which could cause positional deviation between the pattern of the decoration sheet and the concave or convex contour of the molded body, thus failing to achieve desired foil decoration on the surface of molded body. In an extreme case, wrinkling or breakage may occur.

The problems caused by the stretching of the decoration sheet can be avoided to some extent by preliminarily heating to soften the decoration sheet by the hot platen as described above; but, even in that case, if a molded body had large level differences or curvature of surface, wrinkles or distortion would tend to appear because of increase of the stretching and drawing amounts of the decoration sheet. Therefore, it was difficult to effect foil decoration as expected. Further, if the stretching speed is decreased to relief the stress in order to deform the heated and softened decoration sheet in large stretching and drawing amounts, strain deformation of the sheet becomes distinct in this case because of its own weight or the like during a period before it reaches the cavity surface.

SUMMARY OF THE INVENTION

Under such circumstances, an object of the present invention is to provide a process for effecting injection-molded-in foil decoration in which foil decoration can be suitably effected on a molded body having large level differences and curvature of the surface without substantial distortion, position shift, and the like, and its apparatus.

A first feature of the present invention is a process for effecting injection-molded-in foil decoration, comprising the steps of retaining a decoration sheet relative to a female die so that the decoration sheet is curved substantially along a surface of a cavity of the female die; heating the decoration sheet retained relative to the female die by a hot platen to soften the decoration sheet; bringing the decoration sheet into close fit to the surface of the cavity; coupling the female die with a male die to clamp the dies; and effecting injection molding by pouring and filling a molten resin between the female die and the male die, thereby adhering the decoration sheet to an injection molded article.

A second feature of the present invention is a process for effecting injection-molded-in foil decoration, comprising the steps of: retaining a decoration sheet relative to a female die so that the decoration sheet is curved substantially along a surface of a cavity of the female die; heating the decoration sheet retained relative to the female die by a flexible sheet heating body to soften the decoration sheet; bringing the decoration sheet into close fit to the surface of the cavity; coupling the female die with a male die to clamp the dies; and effecting injection molding by pouring and filling a molten resin between the female die and the male die, thereby adhering the decoration sheet to an injection molded article.

A third feature of the present invention is a process for effecting injection-molded-in foil decoration, comprising the steps of: introducing a decoration sheet so that the sheet is curved substantially along a surface of a cavity of a female die; retaining the decoration sheet relative to the female die in such a curved state as to be substantially along the surface of the cavity thereof; heating the decoration sheet retained relative to the female die by heating means to soften the sheet; bringing the decoration sheet into close fit to the surface of the cavity; coupling the female die with a male die to clamp the dies; and effecting injection molding by pouring and filling a molten resin between the female die and the male die, thereby adhering the decoration sheet to an injection molded article.

A fourth feature of the present invention is an apparatus for effecting injection-molded-in foil decoration, comprising: a female die having a surface of a cavity; a male die arranged to be opposed to the female die with a decoration sheet inbetween and having a resin pouring port; a sheet clamp having a periphery stop frame which is in contact with the periphery of the cavity of the female die and a sheet stop frame, attached to the periphery stop frame, for keeping the decoration sheet curved substantially along the surface of the cavity, for retaining the decoration sheet inside the cavity; a hot platen for heating the decoration sheet retained relative to the female die by the sheet clamp; moving means for moving the sheet clamp and the hot platen each relative to the female die; and sheet supply means for supplying the decoration sheet to the cavity surface side of the female die.

A fifth feature of the present invention is an apparatus for effecting injection-molded-in foil decoration, comprising: a female die having a surface of a cavity and a suction port opening at the surface of the cavity; a male die arranged to be opposed to the female die, and having a resin pouring port; a sheet clamp having a projection which makes a decoration sheet curved substantially along the surface of the cavity, for retaining the decoration sheet in cooperation with the periphery of the cavity; and sheet supply means for supplying the decoration sheet to the cavity surface side of the female die, wherein a curved slit is formed in said sheet clamp, a sheet heating body is inserted into the slit in the sheet clamp, and the sheet heating body is curved in the slit substantially in the same shape as that of the decoration sheet retained by the sheet clamp.

A sixth feature of the present invention is an apparatus for effecting injection-molded-in foil decoration, comprising: a female die having a surface of a cavity and a suction port opening at the surface of the cavity; a male die arranged to be opposed to the female die, and having a resin pouring port; a sheet clamp having a projection which makes a decoration sheet curved substantially along the surface of the cavity, for retaining the decoration sheet in cooperation with the periphery of the cavity; and sheet supply means for supplying the decoration sheet to the cavity surface side of the female die, wherein a frame body for housing and holding a sheet heating body, in which a curved slit is formed, is provided on an opposite side to the female die with respect to said sheet clamp, the sheet heating body is inserted into the slit of the frame body for housing and holding the sheet heating body, and the sheet heating body is curved in the slit substantially in the same shape as that of the decoration sheet retained by the sheet clamp.

A seventh feature of the present invention is an apparatus for effecting injection-molded-in foil decoration, comprising: a female die having a surface of a cavity and a suction port opening at the surface of the cavity; a male die arranged to be opposed to the female die, and having a resin pouring port; a sheet clamp having a curved projection, for retains a decoration sheet in cooperation with the periphery of the cavity of the female die; sheet supply means for supplying the decoration sheet to the cavity side of the female die; and heating means for heating the decoration sheet; wherein said female die is provided with a curved recess corresponding to the projection of said sheet clamp, a pair of sheet guide grooves are provided on a surface of the curved recess, and sheet pinching means for pinching the both side edges of the decoration sheet is moved along the sheet guide grooves.

According to the first feature, after retaining the decoration sheet relative to the female die so that the decoration sheet is curved substantially along the surface of the cavity thereof, the decoration sheet is heated and softened by the hot platen and then is brought into close fit to the surface of the cavity, whereby the decoration sheet can smoothly be brought into close fit to the surface of the cavity.

According to the second feature, after retaining the decoration sheet relative to the female die so as that the decoration sheet is curved substantially along the surface of the cavity thereof, the decoration sheet is heated and softened by the flexible sheet heating body and then is brought into close fit to the surface of the cavity, whereby the decoration sheet can smoothly be brought into close fit to the surface of the cavity.

According to the third feature, after introducing the decoration sheet so that the decoration sheet is curved substantially along the surface of the cavity of the female die and retaining the decoration sheet in this state, the decoration sheet is heated and softened by the heating means, whereby the decoration sheet can smoothly be brought into close fit to the surface of the cavity.

According to the fourth feature, the decoration sheet is curved substantially along the surface of the cavity by the sheet stop frame of the sheet clamp and is retained by the periphery stop frame so as to be in contact with the periphery of the cavity, and then the decoration sheet is heated and brought into close fit to the surface of the cavity, whereby the decoration sheet can smoothly be brought into close fit to the surface of the cavity.

According to the fifth feature, the decoration sheet is curved substantially along the surface of the cavity by the sheet clamp having the projection, and the sheet heating body is inserted into the slit of the sheet clamp and is curved substantially in the same shape as that of the decoration sheet retained by the sheet clamp to heat the decoration sheet, whereby the decoration sheet can uniformly be heated and smoothly be brought into close fit to the surface of the cavity.

According to the sixth feature, the decoration sheet is curved substantially along the surface of the cavity by the sheet clamp having the projection, the sheet heating body is inserted into the slit of the frame body for housing and holding the sheet heating body, and the sheet heating body is curved substantially in the same shape as that of the decoration sheet retained by the sheet clamp, whereby the decoration sheet can uniformly be heated and smoothly be brought into close fit to the surface of the cavity.

According to the seventh feature, the sheet pinching means for pinching the both side edges of the decoration sheet runs in the pair of sheet guide grooves of the female die, whereby the decoration sheet can be introduced along the surface of the curved recess of the female die. Then the decoration sheet is retained and heated so as to be brought smoothly into close fit to the surface of the cavity.

BRIEF DESCRIPTION OF THE DRAWINGS

FIG. 14 is a schematic drawing to show another embodiment of the sheet clamp.

BEST MODE FOR CARRYING OUT THE INVENTION

First Embodiment

The first embodiment of the present invention will be described in detail below with reference to the drawings.

Figure 1:
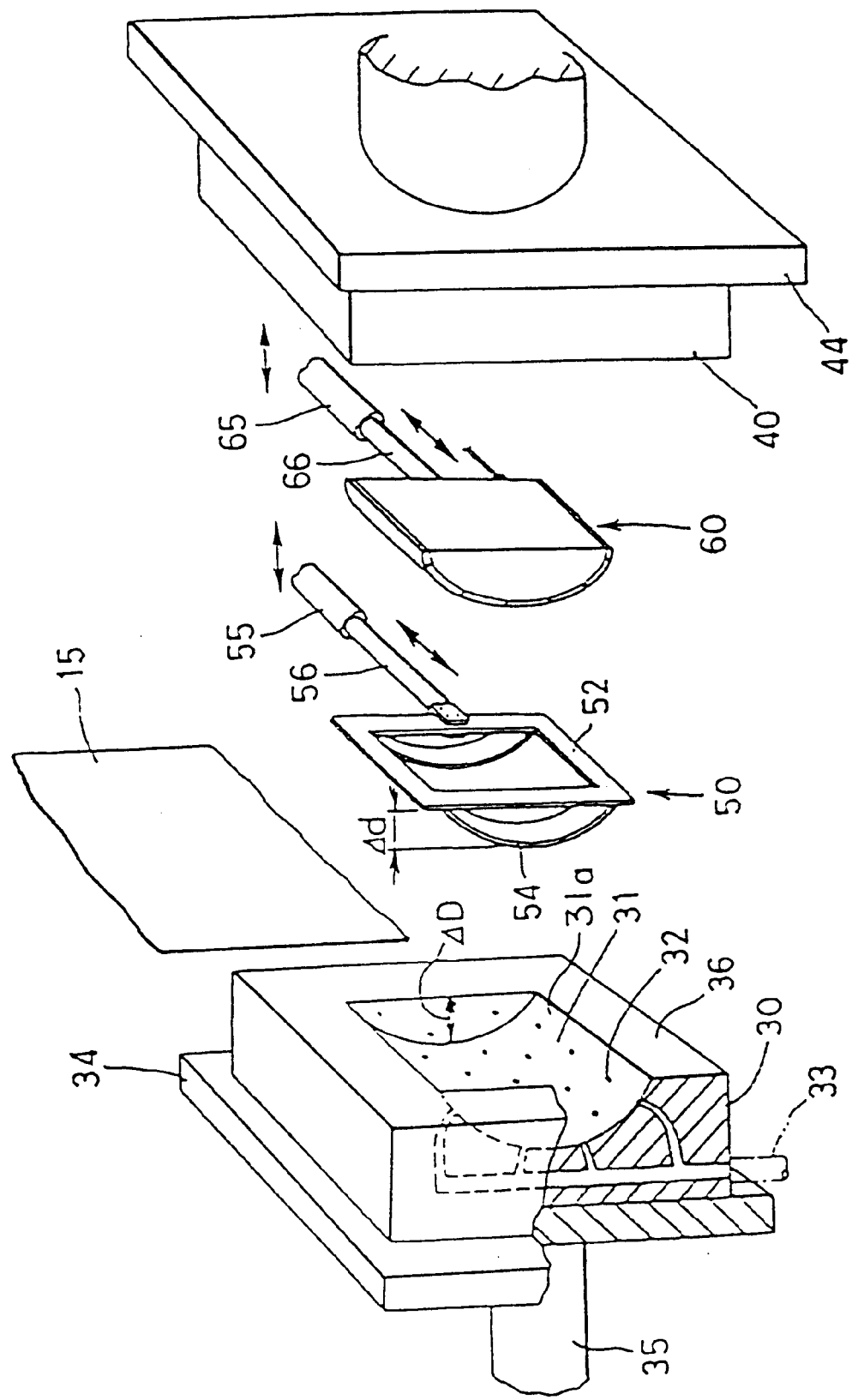
FIG. 1 is a schematic drawing to show an apparatus for effecting injection-molded-in foil decoration in the first embodiment of the present invention.

FIG. 1 is a schematic drawing to show an example of the apparatus for effecting injection-molded-in foil decoration of the present embodiment. The apparatus of the present invention comprises a female die 30 similar to that in the conventional example and a male die 40 arranged to be opposed to the female die 30. The female die 30 is provided with a cavity 31 having a cavity surface 31a corresponding to the contour of a molded body to be molded and a plurality of suction ports 32 formed inside the female die 30 and opening on the cavity surface 31a. The suction ports 32 are connected to an unrepresented vacuum pump through a suction tube 33. The male die 40 is fixed to a stationary platen 44, and the female die 30 is connected to a pressure ram 35 through a moving plate 34, whereby the female die 30 is arranged as movable relative to the male die 40. Further, the male die 40 has a core 41 which is to be inserted into the molding cavity 31 of the female die 30, as in the conventional case, and a pouring port (pouring gate) 47 of a molten-resin-injecting unit is formed inside thereof.

A sheet clamp 50 and a curved hot platen 60 are arranged as movable into or away from between the female die 30 and the male die 40, and a decoration sheet 15 is passed through between the female die 30 and the sheet clamp 50.

The sheet clamp 50 is made of, for example, a stainless steel plate, etc. and has a periphery stop frame 52, which comes into contact with the outer periphery of the molding cavity 31 of the female die 30, and sheet stop frames 54 fixed to the periphery stop frame 54 and projecting into the molding cavity while used. The sheet stop frames 54 have a level difference smaller than that of the cavity surface 31a and a curvature equal to or smaller than that of the cavity surface 31a, and, as described below, retain the decoration sheet 15 in such a state as to be pushed into the cavity 31.

Here, the level difference ΔD of the cavity surface 31a of the female die 30 is defined as a depth of the deepest point of a recessed portion of the cavity surface 31a measured from the level of a parting plane 36 in the case that the female die 30 has a recessed cavity surface 31a as in FIG. 1. On the other hand, in the case that the female die 30 has a projecting cavity surface 31a as in FIG. 13, it is defined as a height of the highest point of a projecting portion of the cavity surface 31a measured from the level of the parting plane. A level difference Δd of the decoration sheet 15 is defined as a difference of elevation from the flat portion of the sheet to the highest portion or the deepest portion of the decoration sheet 15. In the present invention, ΔD>Δd.

FIG. 1 shows two sheet stop frames 54 at positions corresponding to the both ends of the cavity 31, but without necessarily having to be limited to two, the number may be three or more according to the size, the depth, the shape, etc. of the cavity surface 31a. The sheet clamp 50 is fixed to a rod 56 of an air cylinder 55, whereby it is arranged to be put in and out between the female die 30 and the male die 40 by the air cylinder 55 and is also arranged as movable in the directions to approach and leave the female die 30 through an unrepresented driving mechanism.

Figure 2:
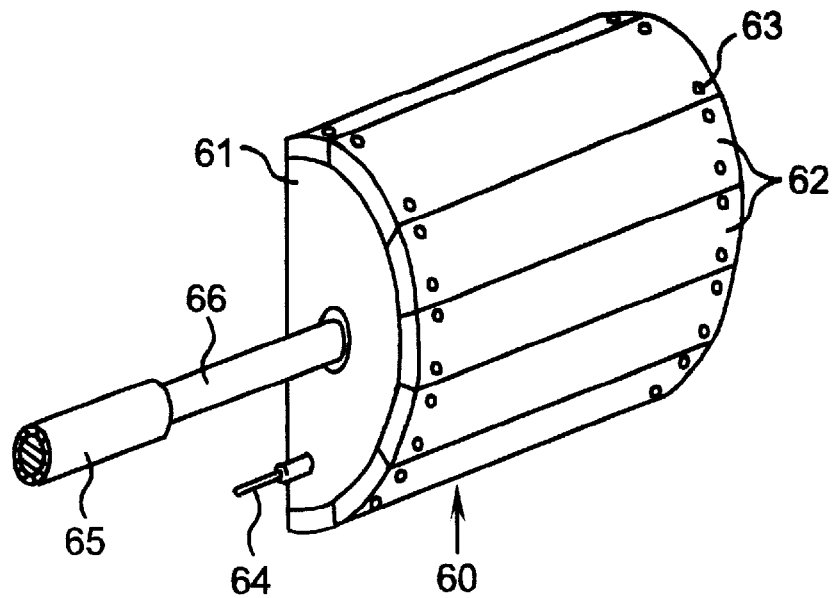
FIG. 2 is a detail view of a curved hot platen shown in FIG. 1.

The curved hot platen 60 has a plurality of sheet heating bodies 62, which are fixed to a surface of a hot platen main body 61 by screws 63, and the surface on the side of the female die 30 is a heating surface, as shown in detail in FIG. 2. An electric current is supplied to the sheet heating bodies 62 from an unrepresented power supply through a line 64, so that the entire surface uniformly generates heat by heaters buried inside. The curved hot platen 60 is also fixed to a rod 66 of an air cylinder 65, and it is so arranged as to be put in and out between the female die 30 and the male die 40 and as to be movable in the directions to approach and leave the female die 30 by an unrepresented driving mechanism in the same manner as the sheet clamp 50.

Next described is a process for effecting foil decoration at the same time as injection molding, using the apparatus of the present embodiment.

Figure 3:
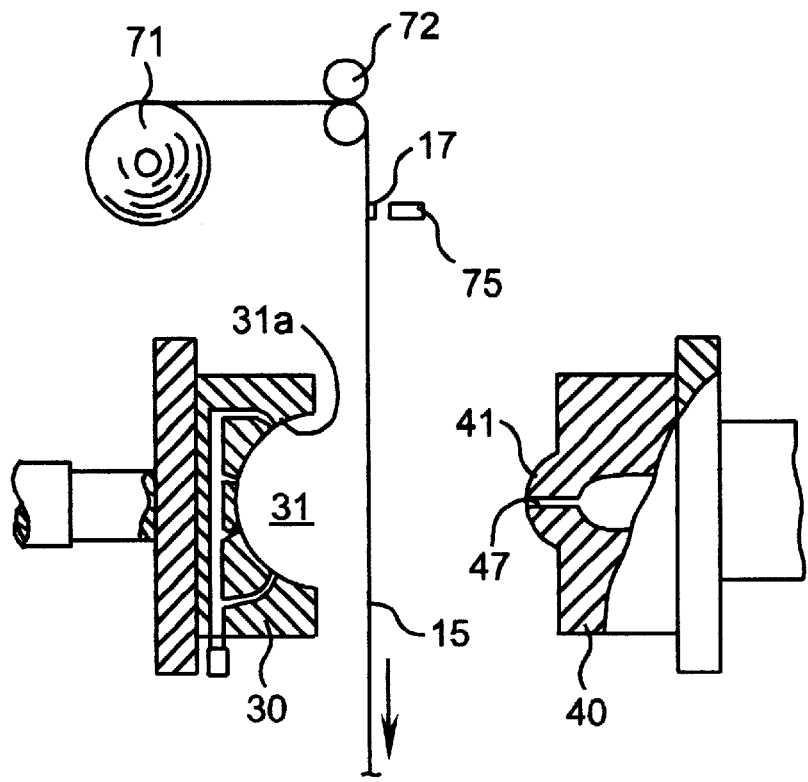
FIG. 3 is a drawing to illustrate a step for effecting foil decoration at the same time as injection molding, using the apparatus for effecting injection-molded-in foil decoration in FIG. 1.

As shown in FIG. 3, the decoration sheet 15 is drawn out from a feed roll 71 through lead-on rolls 72, 72 so as to run in front of the female die 30. The front end of the decoration sheet 15 is pulled in the arrow direction by an unrepresented means so that the decoration sheet 15 may be kept not loosened. Desired patterns are printed at a predetermined pitch on the decoration sheet 15. In the case that the sheet is either a reverse printing bonded and layered sheet or a transfer sheet, the printed surface is set on the opposite side to the female die 30; in the case of a normal printing bonded and layered sheet, the printed surface is set on the side of the female die 30. Further, positioning marks 17 (for example, register marks, cross marks, rectangles, stripes, etc.) are printed at a predetermined pitch or in an endless manner (as stripe patterns) on the decoration sheet 15 together with the patterns.

First, in such a state that the sheet clamp and the curved hot platen are withdrawn from between the female and male dies 30, 40, the decoration sheet 15 is unwound by a length of one shot from the feed roll 71 through the lead-on rolls 72, 72. This one-shot unwinding and positioning of a pattern relative to the female die 30 is completed by stopping the drive of the sheet when a position sensor 75 such as a phototube detects the mark 17 on the sheet. In order to enable positioning in the longitudinal and lateral directions of the decoration sheet 15, it is ordinary practice to set vertical and horizontal pairs of position sensors, for example.

Further, if the patterns on the decoration sheet 15 are a whole-area, single-colored pattern which does not require positioning, the positioning step may be omitted.

Figure 4:
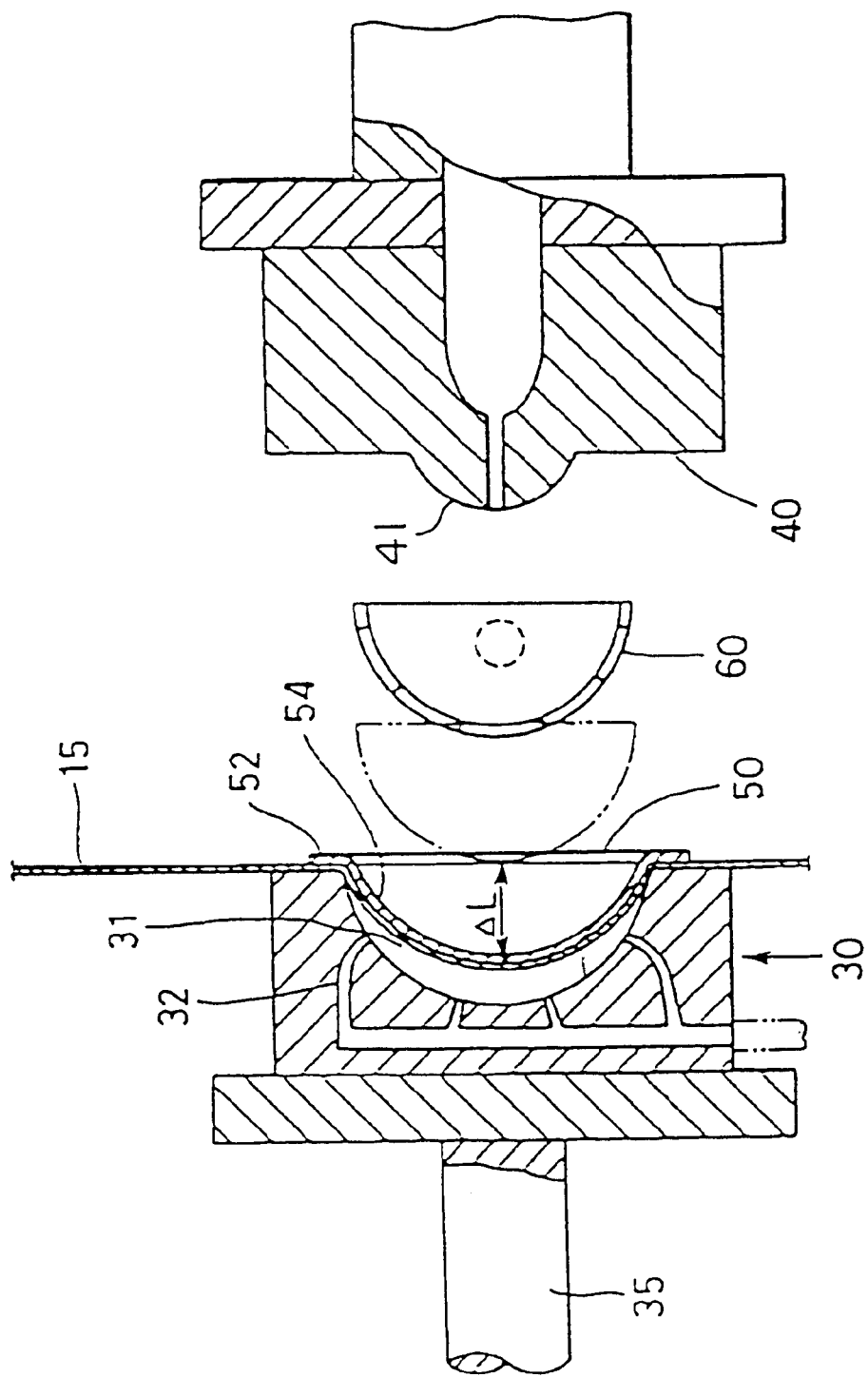
FIG. 4 is a drawing to illustrate a step of clamping a decoration sheet and heating it by the curved hot platen.

Next, the sheet clamp 50 and the curved hot platen 60 are introduced between the female die 30 and the male die 40. Then the sheet clamp 50 is driven to approach the female die 30, so that the decoration sheet 15 is clamped on the periphery of the molding cavity of the female die by the periphery stop frame 52, as shown in FIG. 4. The decoration sheet 15 is pushed in the cavity 31 by the curved stop frames 54 of the sheet clamp 50, and is deformed and retained in a shape projecting on the side of the cavity 31 in such a state that the level difference of the decoration sheet is smaller than that of the cavity surface and that the curvature of the decoration sheet 15 is equal to or smaller than that of the cavity surface 31a. At this time, the cavity surface 31a is closed by the decoration sheet 15, which makes such a state that a space isolated from the atmospheric pressure is formed in a step of reducing the pressure inside the cavity 31 as described below. The curved stop frames 54 of the sheet clamp 50 are designed in such shape, curvature, or the like as not to cause a wrinkle or breakage of the decoration sheet 15 deformed as projected in the cavity 31 when pushed, before heating to soften.

While the decoration sheet 15 is clamped on the periphery of the molding cavity 31 of the female die, the curved hot platen 60 is introduced between the female and male dies 30, 40, or it is further moved closer to the decoration sheet 15 clamped, as shown by the dashed line, whereby the entire surface of the decoration sheet 15 is uniformly heated and softened. The surface shape of the heating surface of the curved hot platen 60 is the same or substantially the same as that of the decoration sheet 15 which is deformed and retained in the projecting state into the cavity 31 by the sheet clamp 50. The decoration sheet 15 may be heated mainly by radiation heat in a non-contact state in which a space ΔL between the curved hot platen 60 and the decoration sheet 15 deformed and retained is set as ΔL>0 and while each portion of the decoration sheet 15 is kept substantially at an equal distance relative to the hot platen surface; or the decoration sheet 15 may be heated mainly by heat conduction in a state of ΔL=0 in which the decoration sheet 15 is kept in close fit to the surface of the hot platen 60. In this case, if portions of the decoration sheet 15 in contact with the sheet stop frames 54 of the sheet clamp 50 are heated less behind the stop frames 54 than the other portions, another heater may be added to the sheet stop frames 54 to auxiliarily heat the portions.

In either case, the curved hot platen 60 of the present invention has the heating surface, which is of the same shape or of substantially the same shape as the surface shape of the decoration sheet 15 retained by the sheet clamp 50 in a state where the sheet 15 projects into the molding cavity 31, whereby the entire surface of the decoration sheet 15 can be uniformly heated and softened.

Figure 5:
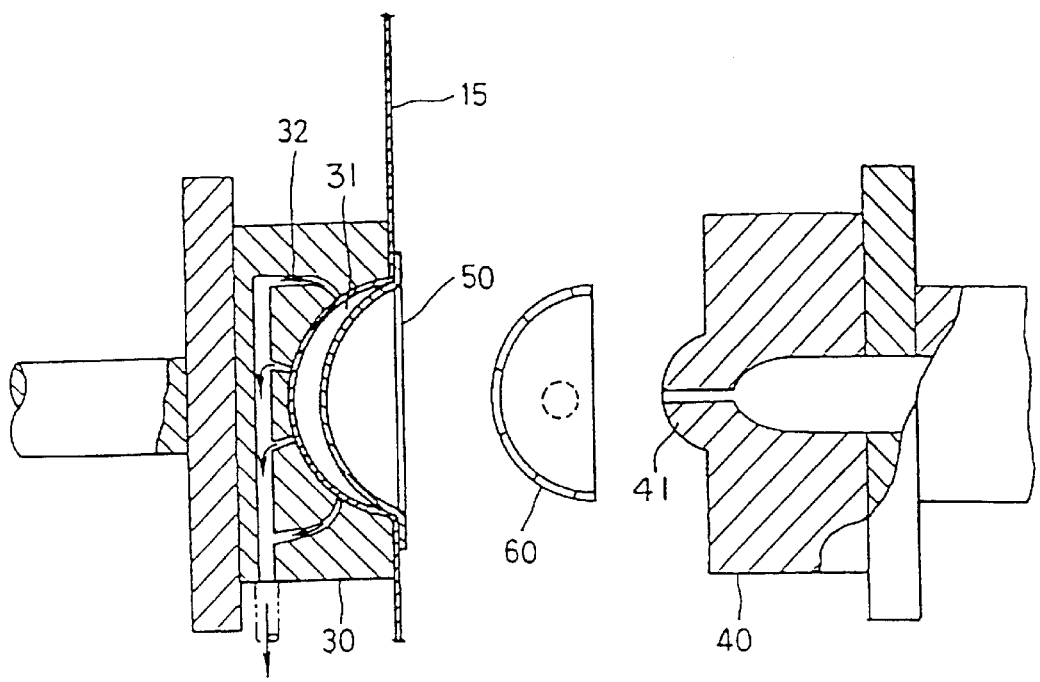
FIG. 5 is a drawing to illustrate a step of effecting suction fitting of the softened decoration sheet onto the inner periphery of a molding cavity in a female die.

Then, as shown in FIG. 5, a vacuum pump is operated so as to evacuate inside the molding cavity 31 of the female die 30 through the suction ports 32, whereby the softened decoration sheet 15 retained by the sheet clamp 50 is drawn toward the cavity surface 31a of the molding cavity 31 into close fit therewith. Further, if necessary, exhaust ports may be formed in the surface of the hot platen 60 to blow compressed air therethrough at this moment, thereby assisting the close fitting of the decoration sheet 15 to the cavity surface 31a of the female die 30.

According to the premolding step of the present invention, the decoration sheet 15 is preliminarily made to be projected and deformed in the molding cavity 31 of the female die 30 by the sheet clamp 50, the decoration sheet 15 is heated and softened in that state, and thereafter a molten resin reaches up to the molding cavity surface 31a. This decreases a deformation amount (stretching amount) of the softened decoration sheet 15 and a stretching speed when the sheet is drawn into close fit to the cavity surface 31a, which can reduce distortion, wrinkles, and breakage of the decoration sheet 15, and positional deviation between the pattern and the contour of the molded article.

Figure 6:
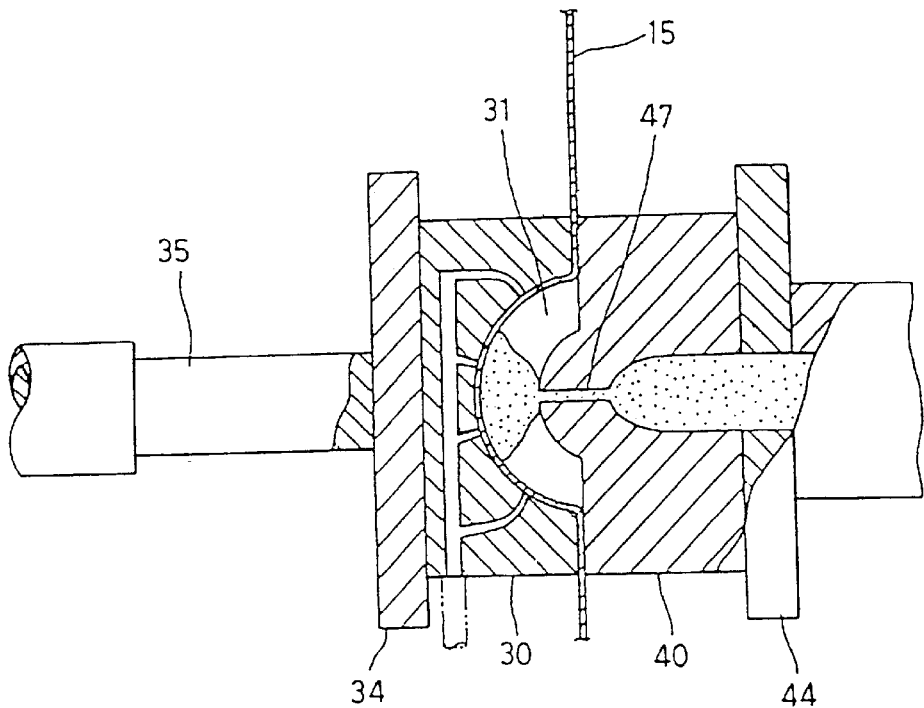
FIG. 6 is a drawing to illustrate an injection molding step.

After completion of the premolding as described above, the sheet clamp 50 and the curved hot platen 60 are moved in the leaving direction from the female die 30 and are withdrawn from between the female and male dies 30, 40. Then, as shown in FIG. 6, after the female and male dies 30, 40 are clamped by the pressure ram 35, the molten resin is poured to fill in the cavity 31 through the pouring port 47 of the injecting unit formed in the male die 40, thus injection molding is performed.

The injected resin may be a resin solution which is cured by a chemical reaction, such as a polyurethane using an isocyanate as a curing agent or an unsaturated polyester using an isocyanate, an organic sulfonate, or the like as a curing agent in addition to a fluidized thermoplastic resin as heat-melted, such as a polyvinyl chloride, a polystyrene, an ABS resin, an acrylic resin, or a polycarbonate.

The injected resin is cooled and solidified in this state, whereby the decoration sheet 15 in the female die 30 comes to integrate and adhere to the injected resin.

Figure 7:
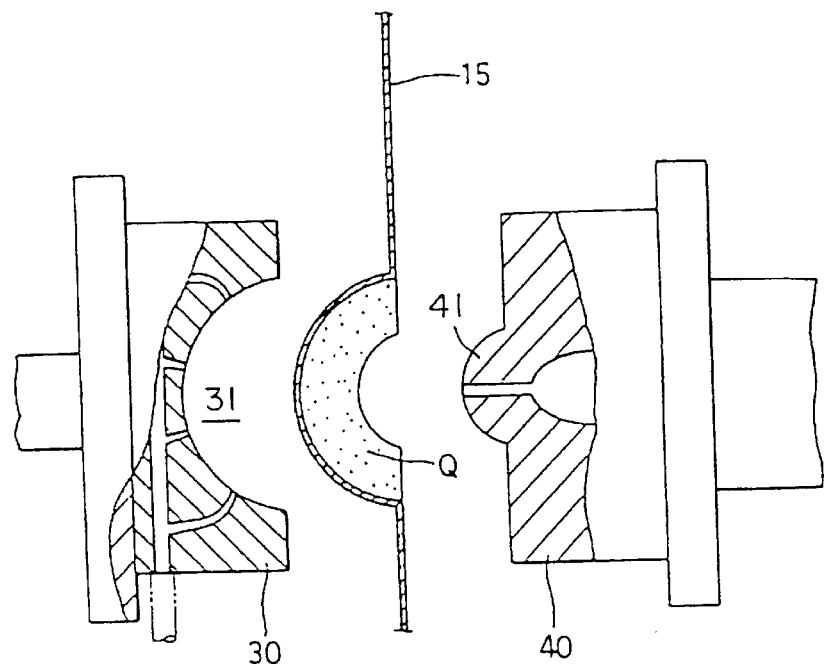
FIG. 7 is a drawing to illustrate a step of taking a foil decoration molded body out.
Figure 8A:
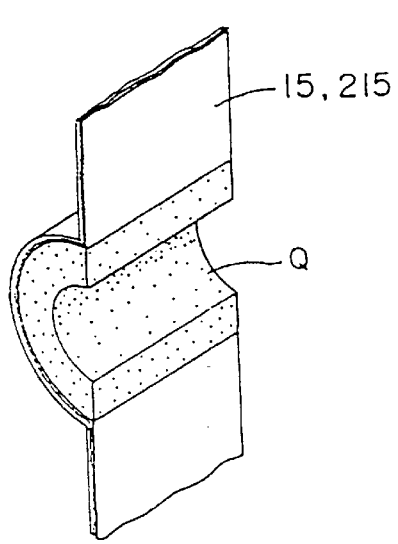
FIG. 8A is a drawing to show a molded article in which a decoration sheet is a bonded and layered film.
Figure 8B:
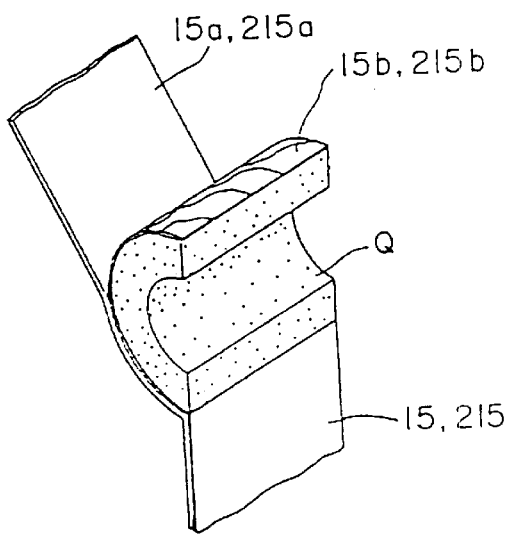
FIG. 8B is a drawing to show a molded article in which a decoration sheet is a transfer film.

Next, as shown in FIG. 7, the female and male dies 30, 40 are opened to release a molded body Q with foil decoration from the dies 30, 40. Here, if the decoration sheet 15 is a bonded and layered film (laminate film), the foil decoration is already effected as it is, and all the layers of the decoration sheet 15 are adhered to be integrated onto the surface of the molded body Q to form a decorative layer (FIG. 8A). On the other hand, if the decoration sheet 15 is a transfer film, only a base sheet 15a of the decoration sheet 15 integrated on the surface of the molded body Q is peeled off in a later step so that a transfer layer 15b including a pattern layer etc. may be left on the molded body Q side to form a decorative layer, thereby completing the foil decoration (FIG. 8B).

Immediately after the die opening, the molded body Q often remains adhering to the cavity surfaces of the female die 30 or the surface of the male die 40. In order to release the molded body Q adhering from the dies 30, 40, thereby certainly bringing it into the state of FIG. 7, a known ejector is used to facilitate release from the dies 30, 40, though it is not shown. As an example of the ejector, a slide rod may be set as capable of being projected and withdrawn in the male die 40 or the female die 30, which is projected after the die opening to release the molded body Q from the dies 30, 40. In the steps except for the releasing step, the slide rod is kept as withdrawn to such a position that the top surface thereof is located at the same level as the surface of the dies 30, 40.

Here, the hot platen main body 61 is not necessarily of a semicylindrical shape as shown in FIG. 2 as long as the shape of the heating surface of the curved hot platen 60 may be similar to the shape of the decoration sheet 15 deformed and retained by the sheet clamp 50. For example, the hot platen main body 61 may be a curved plate-like member and a heat-generating panel may be stuck on the surface thereof. Modification 1

Figure 9:
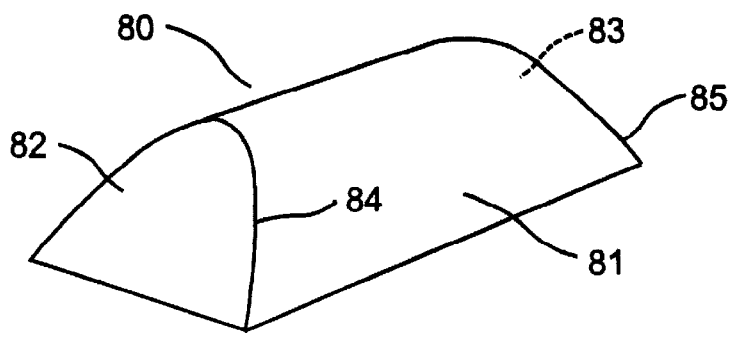
FIG. 9 is a drawing to show another example of the molded body.

Described is an embodiment in which the foil decoration is effected simultaneously on a curved side surface 81 and end faces 82, 83 of a molded body 80 as shown in FIG. 9.

In this embodiment, the shape of the molding cavity of the female die 30 and the shape of the male die 40 are naturally required to match the shape of the molded body 80, but the fundamental structure of apparatus is the same as shown in FIG. 1. Namely, the sheet clamp 15 and the curved hot platen 60 are arranged as movable into or away from between the female die 30 and the male die 40.

Figure 10:
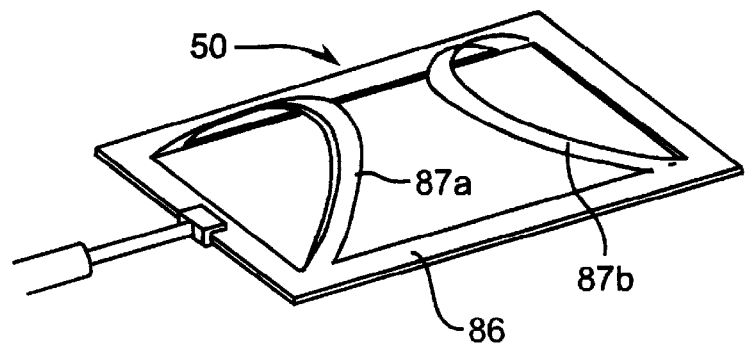
FIG. 10 is a schematic drawing to show another embodiment of the sheet clamp.

As shown in FIG. 10, the sheet clamp 50 has a periphery stop frame 86 and two curved stop frames 87a, 87b extending therefrom substantially in an arc shape, and the two curved stop frames 87a, 87b are arranged so as to come closer to each other as approaching the center of the stop frame 52. By corresponding the stereoscopic shape of the curved stop frames 87a, 87b of the sheet clamp 50 to the ridges 84, 85 of the molded body 80 in this manner, the decoration sheet 15 can be made to project into the cavity 31 of the female die 30 so as to be deformed and retained in such a state that the level difference thereof is smaller than the level difference ΔD of the molding cavity surface 31a, that the curvature thereof is smaller than or equal to the curvature of the cavity surface 31a, and that the shape is corresponding to that of the cavity surface 31a. It is a matter of course that the degree of projection of the curved stop frames 87a, 87b from the periphery stop frame 86 has to be determined within the range not causing wrinkles or breakage of the sheet to be deformed thereby, before softening.

Figure 11:
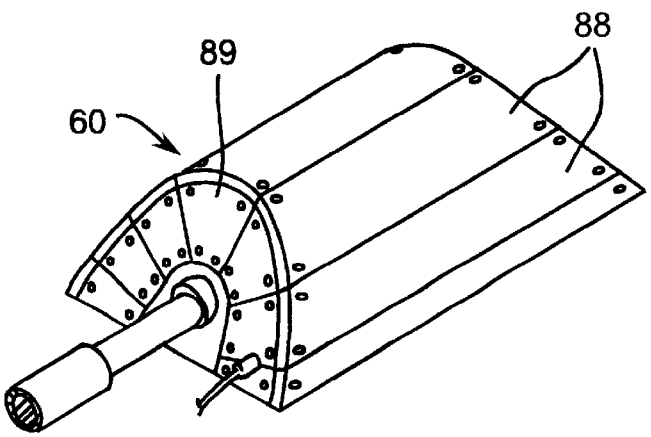
FIG. 11 is a schematic drawing to show another embodiment of the curved hot platen.

Further, as schematically shown in FIG. 11, the curved hot platen 60 is formed in such a manner that sheet heating bodies 88, 89 are attached around the hot platen main body 61 so that the heating surface may have substantially the same surface shape as that of the decoration sheet 15 deformed and retained by the sheet clamp 50. In this embodiment, the sheet heating bodies 88, 89 are provided not only on the curved side surface, but also on the other two surfaces. This curved hot platen 60 may be arranged to heat the decoration sheet 15 deformed and retained by the sheet clamp 50 mainly by heat conduction as kept in contact with the entire surface of the sheet 15, or to heat it mainly by radiation heat as keeping substantially constant the distance between the decoration sheet 15 and the surface of the curved hot platen 60, similarly as in the previous embodiment.

The decoration sheet 15 softened by heating is drawn to adhere to the cavity surface 31a by evacuating the inside of the molding cavity 31 through the suction ports 32 formed in the female die 30 as in the previous embodiment.

According to the premolding of the present embodiment, the sheet clamp 50 preliminarily deforms the decoration sheet 15 into the shape according to that of the molding cavity 31 so as to make it project into the cavity 31 of the female die 30, whereby the deformation amount of the decoration sheet 15 when drawn to adhere to the cavity surface 31a becomes small, which can reduce distortion, wrinkles and breakage of the decoration sheet 15, and positional deviation between the pattern and the contour of the molded article.

The steps after the premolding are the same as those previously described, and the detailed description thereof is omitted herein.

Modification 2

Figure 12:
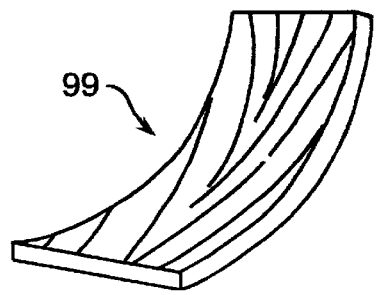
FIG. 12 is a drawing to show another example of the foil decoration molded article.

Produced was a molded article 99 with foil decoration having a curved shape as shown in FIG. 12 and having decoration on the inside surface. This molded article with foil decoration is used as an interior member for automobile.

Figure 13:
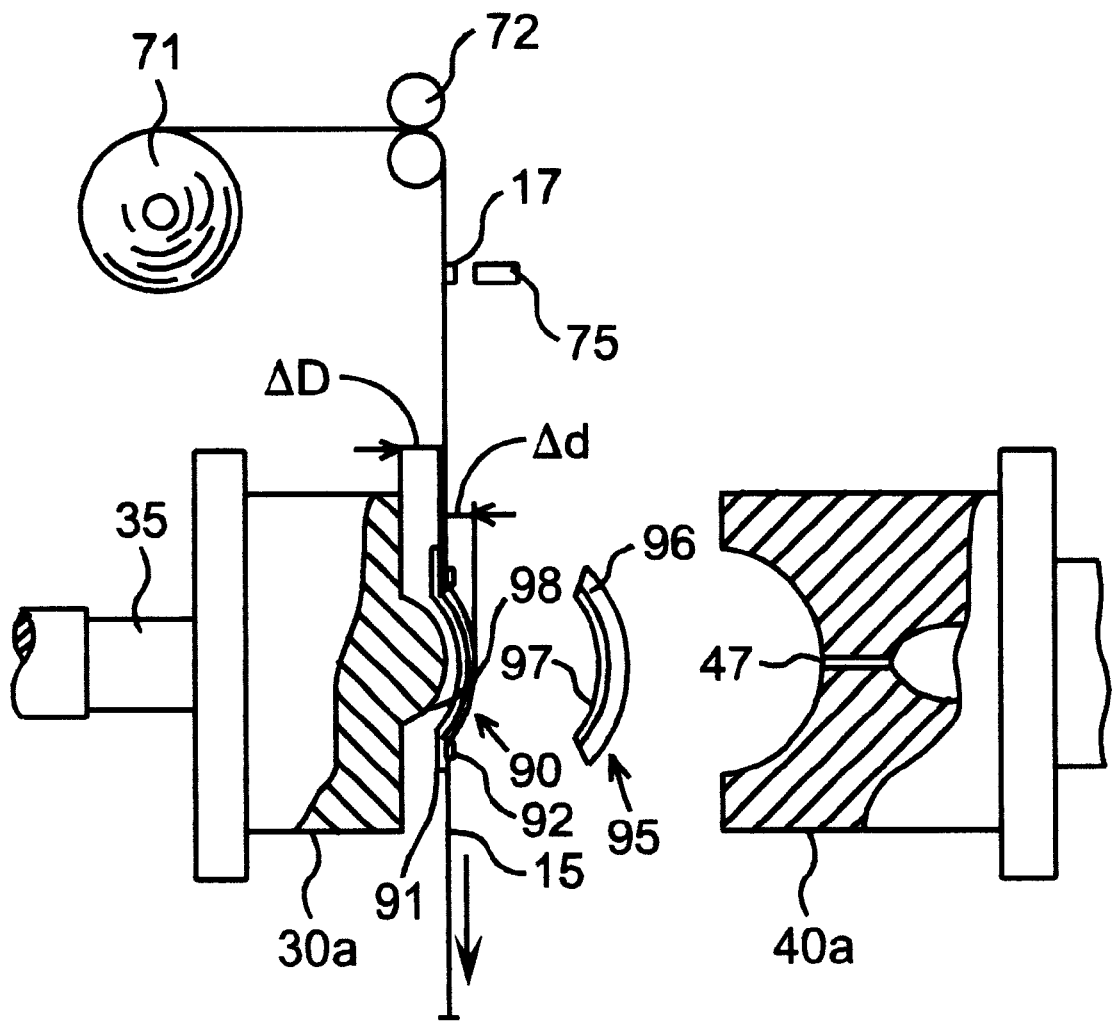
FIG. 13 is a schematic drawing to show another embodiment of the apparatus for effecting injection-molded-in foil decoration.

The structure of the apparatus for effecting injection-molded-in foil decoration of the present embodiment is schematically shown in FIG. 13. In the apparatus of the present embodiment, a molding cavity surface 98 of a female die 30a is a projecting surface, different from the apparatus in the previous embodiment. A sheet clamp 90 has a curved stop frame 91 having the shape substantially similar to the curved shape of the molding cavity surface 98 of the female die and an auxiliary clamp 92, which is arranged as movable into or away from between the female die 31a and the decoration sheet 15. A curved hot platen 95 is composed of a curved plate-like main body 96 and a sheet heating body 97 attached onto the surface thereof on the female die side, and is arranged as movable into or away from between the female die 30a and the male die 40a in the same manner as the sheet clamp 90. The surface shape of the sheet heating body 97 is substantially the same as that of the decoration sheet 15 deformed and retained by the sheet clamp 90. Accordingly, the heating surface of the curved hot platen 95 of the present embodiment is a recessed surface.

Next described is a process for producing the molded article with foil decoration as shown in FIG. 12 by effecting foil decoration at the same time as injection molding, using the apparatus as shown in FIG. 13.

The sheet clamp 90 is introduced into between the female die 30a and the decoration sheet 15 as the female die 30a is kept as moved to the left of the drawing by the pressure ram 35. The decoration sheet 15 is driven by the lead-on rolls 72 out from the feed roll 71 to run in front of the sheet clamp 90. The decoration sheet 15 is pulled in the arrow direction by an unrepresented means so as not to be loosened. Desired patterns are printed at a predetermined pitch on the sheet 15. If the sheet is a reverse printing bonded and layered film or a transfer sheet, its printing surface is set on the opposite side to the female die 30a; if it is a normal printing sheet, the printing surface is set on the side of the female die 30a. Further, marks 17 (for example, register marks, cross marks, etc.) are printed at a predetermined pitch on the decoration sheet 15 together with the patterns.

Next, the decoration sheet 15 is unwound by a length of one shot by the lead-on rolls 72 from the feed roll 71. The one-shot unwinding and positioning of a pattern relative to the female die 30a is effected by stopping the drive of the sheet when the position sensor 75 such as a phototube detects the positioning mark 17 on the sheet. After completion of the positioning of the sheet 15, the sheet 15 is fixed on the curved stop frame 91 of the sheet clamp 90 by the auxiliary clamp 92. The auxiliary clamp is, for example, a stick member attached to the sheet clamp 90 as to be rotatable, and the sheet 15 may be fixed between the stop frame 91 and the auxiliary clamp 92. Thus, the sheet 15 is deformed and retained by the curved stop frame 91 of the sheet clamp 90 in the shape substantially similar to the molding cavity surface 98. Further, this positioning step can be omitted, if the patterns of the decoration sheet 15 are a single-colored pattern over the entire surface, which does not require positioning.

Next, the curved hot platen 95 is introduced into between the female die 30a and the male die 40a and then is moved toward the decoration sheet 15 retained by the sheet clamp 90, whereby the entire surface of the decoration sheet 15 is uniformly heated and softened. The surface shape of the heating surface of the curved hot platen 95 is the same or substantially the same as the surface shape of the decoration sheet 15 deformed and retained in the projecting state in the cavity by the sheet clamp 90. In order to effect premolding and adhesion of the softened decoration sheet 15 onto the female cavity surface 98 without destruction of the shape of the sheet, heating of the decoration sheet 15 by the curved hot platen 95 may employ either one of the following ways: the decoration sheet 15 softened is heated as fixedly retained on the hot platen 95 to be brought into contact with the female die 30a; a sheet stop periphery wall is provided in the peripheral portion of the surface of the hot platen 95 so as to heat the decoration sheet 15 mainly by radiation heat as kept at a nearly constant distance to the surface of the hot platen 95 in a non-contact state; the decoration sheet 15 is heated mainly by heat conduction as the sheet is drawn into contact with the surface of the hot platen through the suction ports. Since the curved hot platen 95 has the heating surface which is the same or substantially the same as the surface shape of the decoration sheet 15 deformed and retained by the sheet clamp 90, the entire surface of the sheet can be uniformly heated and softened.

Another arrangement may be constructed, as described below, in such a manner that the sheet clamp 90 is fixed to a slide rod attached to the female die 30a, the male die 40a is closed while the sheet clamp 90 pushes the sheet 15 against the female die 30a (as keeping only the hot platen withdrawn), and then injection molding is performed.

Next, fixing of the sheet 15 to the sheet clamp 90 is released by releasing the auxiliary clamp 92, and the sheet clamp 90 and the curved hot platen 95 are withdrawn from between the female die 30a and the male die 40a. Then the female and male dies 30a, 40a are closed by the pressure ram 35 so as to seal the inside of the molding cavity 98, and thereafter the vacuum pump connected to the suction ports in the female die 30a is operated to draw the softened sheet into close fit with the surface 98 of the molding cavity. Thereafter, a molten resin is poured to fill in the molding cavity through the pouring port 47 of the injecting unit formed in the male die 40*a*, thereby effecting injection molding.

Modification 3

Figure 15:
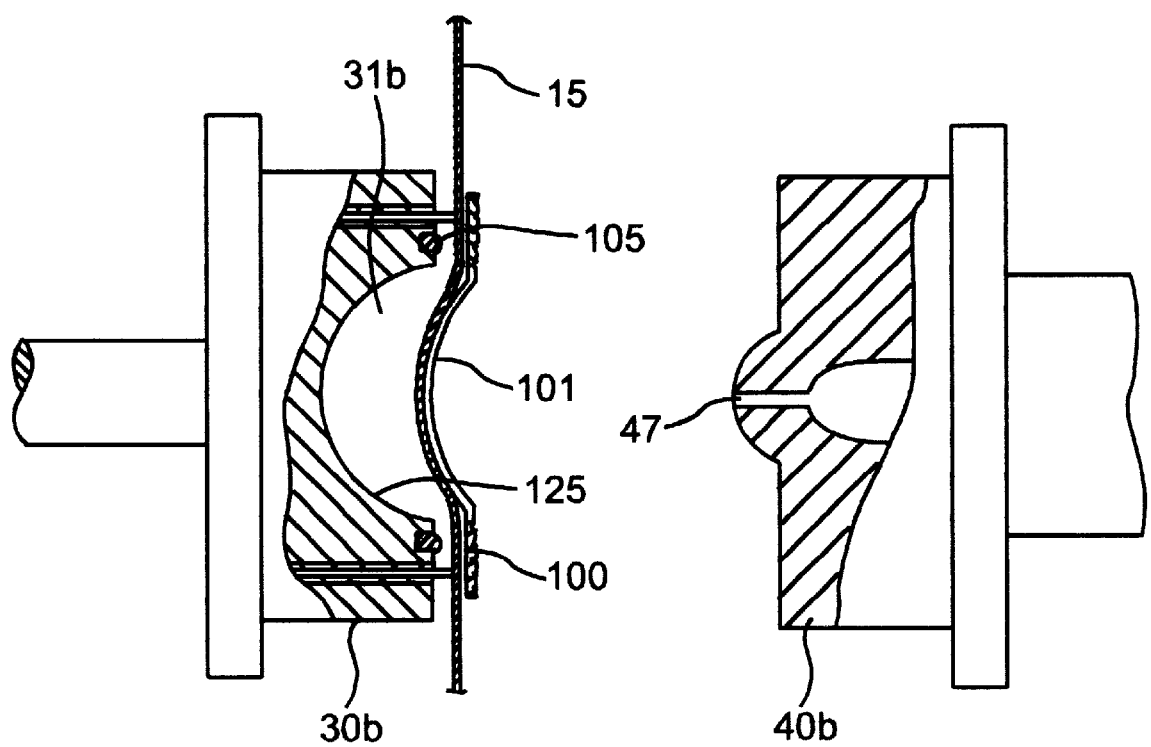
FIG. 15 is a drawing to illustrate the operation of the sheet clamp of FIG. 14.

Described referring to FIG. 14 and FIG. 15 is another embodiment of the sheet clamp used in the apparatus for effecting injection-molded-in foil decoration according to the present invention.

The sheet clamp 100 of the present embodiment is different from the sheet clamp 50, 90 in the previous embodiment in that it is fixed to slide rods 102 set in the female die 30*b* and thus, it is incorporated with the female die 30*b*. The sheet clamp 100 is driven away from the surface 125 of the female die 30*b* toward the male die 40*b* by the slide rods 102, and vice versa, as shown by the arrow in the drawing. A suction groove 104 of line is formed around the molding cavity surface 125 of the female die 30*b* and an O ring 105 is set outside the groove. The suction groove 104 is connected to an external evacuating apparatus through a suction path running inside the female die 30*b*.

As shown in FIG. 15, the decoration sheet 15 runs between the female die 30*b* and the sheet clamp 100. The slide rods are retracted inside the female die 30*b* when the decoration sheet 15 is clamped, and they are driven by an unrepresented driving mechanism to project out from the female die 30*b* when clamping is released.

In the case that the surface 125 of the molding cavity 31*b* of the female die 30*b* is of a recessed shape as shown in FIG. 14, the sheet clamp 100 pushes the decoration sheet 15 to the molding cavity periphery and becomes a part of the female die 30*b*, that is, forms the periphery of the molding cavity, as retaining the sheet 15 in desired shape and curvature. Seal between the female die 30*b* and the decoration sheet 15 is kept by the O ring 105. The decoration sheet 15 deformed and retained by a stop frame 101 of the sheet clamp 100 is heated and softened by the unrepresented curved hot platen introduced into between the female die 30*b* and the male die 40*b*. The shape of the heating surface of the curved hot platen is designed to be substantially the same as the curved shape of the decoration sheet 15 retained as deformed. The decoration sheet 15 may be heated by the curved hot platen mainly by radiation heat in a non-contact state where the distance between the decoration sheet 15 and the curved hot platen surface is kept substantially constant, or mainly by heat conduction in such a state that the decoration sheet 15 is kept in close fit to the curved hot platen surface.

The heated and softened decoration sheet 15 is drawn to adhere to the molding cavity surface 125 by evacuating the inside of the molding cavity surface 125 through the line suction groove 104 connected to the vacuum pump. Thereafter, the curved hot platen is withdrawn, the female die 30*b* and the male die 40*b* are clamped, and the molten resin is poured to fill inside the molding cavity through the pouring port 47 of the injecting unit formed in the male die 40*b*, thus injection molding is performed.

Also in the present embodiment, because the heating surface of the curved hot platen is the same or substantially the same as the surface shape of the decoration sheet 15 fixed by the sheet clamp 100, the entire surface of the decoration sheet 15 can be uniformly heated and softened. Further, the decoration sheet 15 is preliminarily deformed by the sheet clamp 100 so as to project into the molding cavity surface 125 of the female die 30*b*, whereby the deformation amount of the decoration sheet 15 becomes small when drawn into close fit to the molding cavity surface 125, which in turns decreases distortion, wrinkles, and breakage of the decoration sheet 15, and positional deviation between the contour of the molded article and the pattern.

FIG. 14 and FIG. 15 showed the case in which the molding cavity surface 125 of the female die 30*b* was the recessed shape, but it is apparent that the present embodiment can be applied to the cases in which the molding cavity surface 125 of the female die 30*b* is a projecting surface. In those cases, the stop frame 101 of the sheet clamp 106 is curved to project out from the female die 30*b* in a level difference smaller than the level difference ΔL of the molding cavity surface 125 of the female die 30*b* and in a curvature equal to or smaller than the curvature of the cavity surface 125.

Further, the line suction groove 104 formed in the female die 30*b* has the same function as that of the many independent suction ports as shown in FIG. 1, and it is a matter, of course, that many suction ports may be formed all over the molding cavity surface instead of the line suction groove 104.

Modification 4

Figure 16:
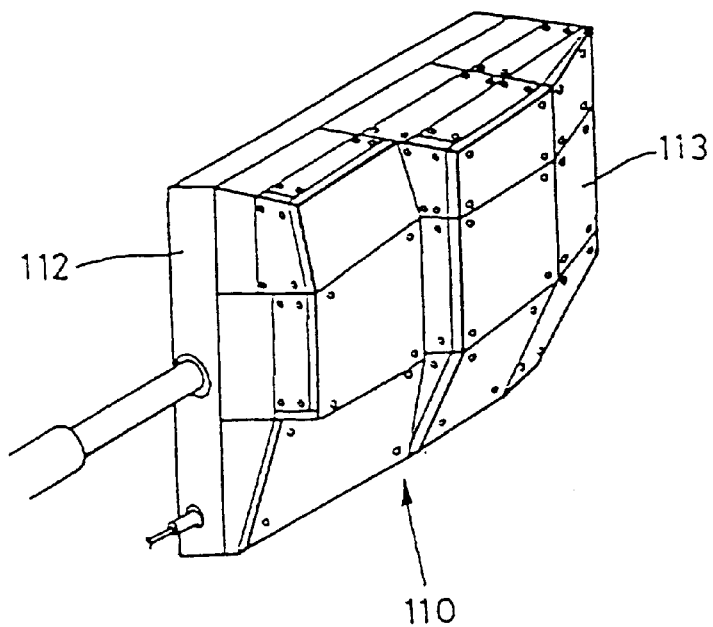
FIG. 16 is a schematic drawing to show another embodiment of the curved hot platen.
Figure 17:
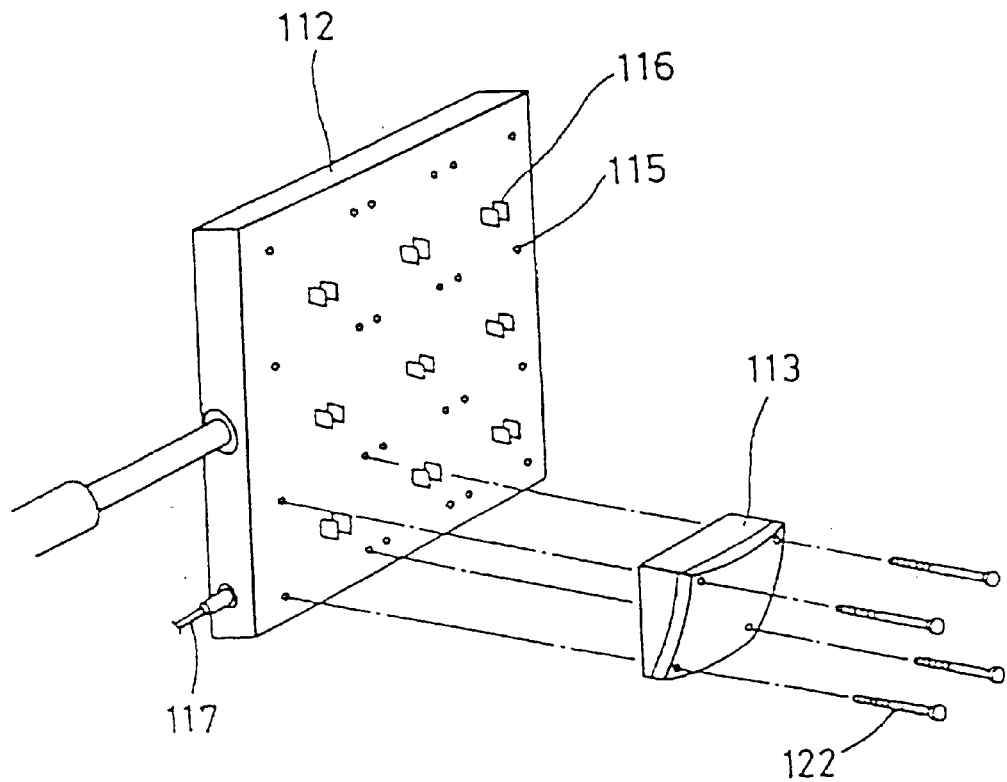
FIG. 17 is a drawing to illustrate a method for mounting a hot platen block unit to a base.

Referring to FIG. 16 to FIG. 18, another embodiment of the curved hot platen used in the apparatus for effecting injection-molded-in foil decoration according to the present invention will be described. In either one of the curved hot platens in the previous embodiments, the shape of the heating surface is fixed, and thus, every time the shapes of the molded body to be produced and the sheet clamp are changed, a new curved hot platen has to be produced in accordance therewith. The curved hot platen of the present embodiment solves such a problem.

FIG. 16 shows a schematic drawing of the curved hot platen of the present embodiment. The curved hot platen 110 is constructed by mounting a plurality of hot platen block units 113 on a flat plate board 112, as shown in the drawing. Plural kinds of hot platen block units 113 are prepared as to the sheet heating bodies such as units having a sheet heating body on only one surface, units having sheet heating bodies on two surfaces, units having sheet heating bodies on three surfaces, and units having no sheet heating body (for example, unit 114), and as to the thickness and shape, some kinds of units are prepared. A desired shape of the heating surface can be obtained by suitably combining these units and fixing them on the board, for example, by means of screw bolts.

Next described are the details of the board and the hot platen block units and a process for mounting the hot platen block units to the board. As shown in FIG. 17, the board 112 has tapped holes 115 for mounting of the hot platen block units and a plurality (3×3=9 in the case illustrated) of plugs 116 for supplying an electric current to associated units. Each plug 116 is connected to an unrepresented power supply by a line 117 extending from the board 112.

Figure 18A:
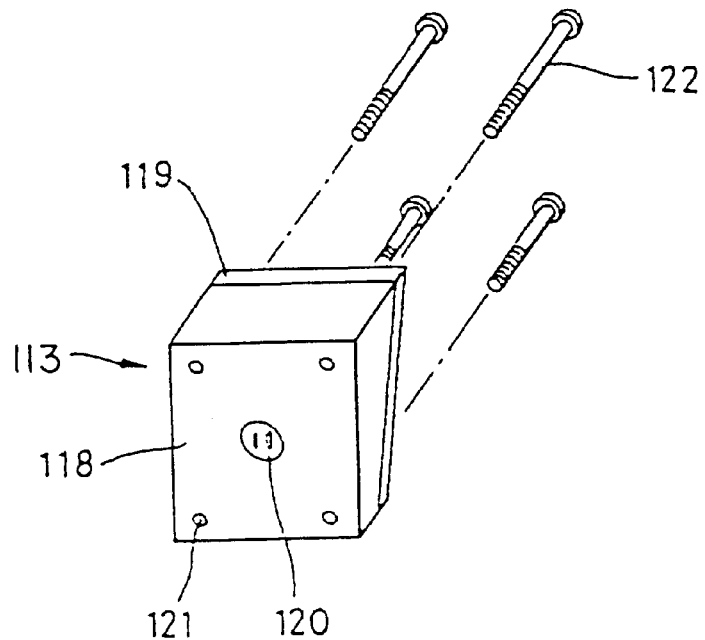
FIG. 18A is a drawing to illustrate the hot platen block unit.
Figure 18B:
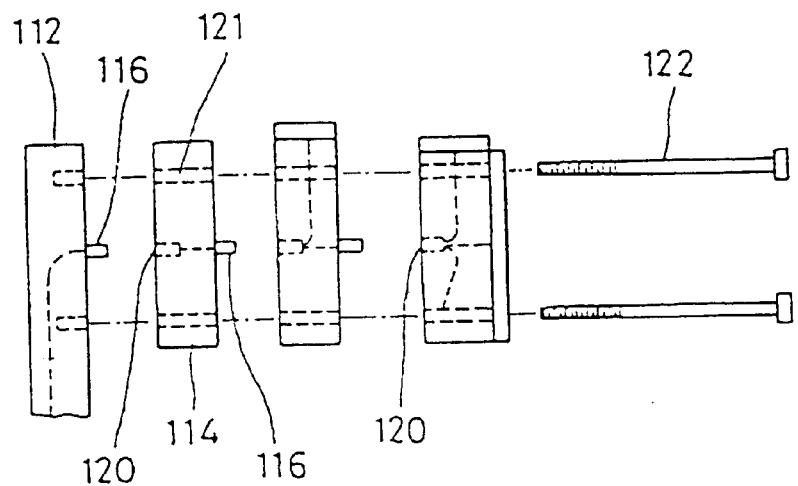
FIG. 18B is a drawing to illustrate the hot platen block unit.

As shown in FIG. 18A, a hot platen block unit 113 is formed by attaching a sheet heating body 119 to the surface of a block main body 118 made of, for example, a ceramic whiteware or a ceramic material, and has a plug socket 120 and bolt-through holes 121 for mounting. The mounting of the hot platen block units 113, 114 to the board 112 is effected by screw bolts 122, as shown in FIG. 17. At that time, a plug 116 projecting from the board is inserted into the plug socket 120 of the hot platen block unit 113, 114, which enables an electric current to be supplied to the sheet heating body 119. Among the hot platen block units, the unit 114, which is set between another hot platen block unit and the board to be hidden inside the hot platen, has only the plug 116, plug socket 120 and screw holes 121 for passage of the bolts for fixing, but has no sheet heating body, which is thus simply used as a unit for relay, as shown in FIG. 18B.

The heating surface of the curved hot platen 110 of the present embodiment is not a perfectly continuous curved surface, but is generally of an approximate shape to a desired, curved surface. Further, as shown in FIG. 16, it may have level differences. However, this curved hot platen 110 can also uniformly heat the decoration sheet 15 deformed and retained by the sheet clamp. Furthermore, the number of the hot platen block units 114 set on the board 112 may be increased, for example, to 10×10, thereby dividing the area on the board into finer segments, and many kinds of surface shapes of outermost units are prepared, whereby level differences appearing in the heating surface become small and an arbitrary curved surface can be approximated in higher precision.

As described above, the curved hot platen 110 of the present embodiment has a plurality of units 113, 114 combined to each other, and an arbitrary shape of curved surface can be approximated by changing a combination of the units 113, 114. Accordingly, simply preparing a certain number of units 112, 113 whose shapes are different to each other, the shape of the heating surface can freely be modified by changing mounting of the units 112, 113, which obviates a need to prepare a new hot platen for every change of the molded body to be produced.

The present specification has illustrated the present invention mainly with the examples in which the foil decoration surface of the molded body is a curved surface, but it is noted that the present invention is by no means limited to the cases where the entire foil decoration surface of the molded body is a smoothly continuous, curved surface. The present invention can be applied likewise to such cases that the foil decoration surface of the molded body is a combination of a flat surface and a curved surface or a combination of only flat surfaces. In the case that the foil decoration surface of the molded body contains a flat surface, the sheet stop frame of the sheet clamp may include a linear portion, and a part or the whole of the heating surface of the hot platen may be composed of flat surfaces.

In the case that heating is hindered at the portions of the decoration sheet 15 in contact with the sheet stop frames 54, thereby causing distortion upon stretching because of insufficient softening of the portions, another heater may be added to the stop frames 54 of the sheet clamp 50, which permits the decoration sheet 15 to be heated more uniformly.

Heating of the decoration sheet 15 by the hot platen may rely on a method for directly heating the decoration sheet 15 in contact with the hot platen mainly by heat conduction (a contact heating method) or on a method for heating the decoration sheet 15 mainly by infrared radiation from the curved hot platen (heating surface) as keeping the pattern portion of the decoration sheet 15 not in contact with the heating surface (a non-contact heating method).

Embodied means of the contact heating method is, for example, a method arranged in such a manner that the surface shape of the hot platen 60 is made to be the same as the shape of the decoration sheet 15 deformed and retained. In this case, suction ports, which are similar to those disclosed in Japanese Laid-open Patent Application No. 59-31130, are formed in the surface of the hot platen 60, and the decoration sheet 15 is heated as kept in close fit to the surface of the hot platen 60 by vacuum suction. Embodied means of the non-contact heating method is, for example, a method of radiation heat arranged in such a manner that the surface shape of the hot platen is made to be the same as the shape of the deformed and retained sheet. In this case, a peripheral wall for retaining the sheet having suction ports in the surface thereof, which is disclosed for example in Japanese Laid-open Patent Application No. 5-301250, is formed in the periphery thereof, and the sheet is fixed at a distance corresponding to the height of the peripheral wall from the surface of the hot platen by the periphery wall, to be heated apart.

The decoration sheet 15 includes a substrate sheet 15a and a decorative layer 15b laminated thereon, and may be either the bonded and layered film. A final product is obtained as the substrate sheet 15a and the decorative layer 15b are integrated in fit with the molded article, or the transfer sheet 15b is left on the molded article side and the substrate sheet 15a is peeled off after the decoration sheet 15 and the molded article Q are once integrated with each other. The substrate sheet 15a applicable may be a thermoplastic resin such as a polyvinyl chloride, an acrylic resin, a polystyrene, an ABS resin, a polycarbonate, a polyester, a polypropylene, etc. The thickness of the substrate sheet 15a is usually in the range of from about 20 to about 500 μm. The decorative layer 15b may be a print pattern layer, a colored or transparent coating layer, or a metal thin film, etc.

The female die 30 and the male die 40 used in the apparatus for effecting injection-molded-in foil decoration of the present invention may have fundamentally the same structure as those in the conventional apparatus, and an uneven pattern or the like may be formed on the molding surfaces of the female die 30 and the male die 40 (whereby an uneven pattern is formed on the molded body accordingly). A material for the female die 30 and male die 40 may be a metal such as iron or a ceramic material. A suction path is preferably formed inside the female die 30 in order to draw the decoration sheet 15 softened by heating, an end of which is connected to a pressure reducing device such as a vacuum pump and the other end of which opens on the molding cavity surface 31a. Further, in the case that the female die 30 is made of a porous ceramic or a porous metal, the porous structure itself may be used as the suction path and suction port.

The injection molding according to the present invention includes the reactive injection molding (so-called RIM molding) for injecting an uncured solution of a curing type resin to be cured by a chemical reaction in addition to the method for injecting a heat-melted thermoplastic resin. In the case of the reactive injection molding, a resin "solution" which is not heat-melted is used. Accordingly, the "molten resin" in the present specification includes a solution of the above resin in addition to the resin in a heat-melted state.

By the process and apparatus for effecting injection-molded-in foil decoration of the present invention, the decoration sheet 15 can uniformly be heated and softened without irregularity. Further, the deformation amount can be reduced in premolding of the decoration sheet 15 heated and softened into the molding cavity surface 31a of the female die 30, which decreases distortion, appearance of wrinkles or breakage of the decoration sheet 15, positional deviation between the decorative layer 15b and the contour of the molded article, and distortion of the decorative layer 15b. Accordingly, the foil decoration can be effected in high quality to the molded article having large level differences or large curvature of the surface.

Second Embodiment

Figure 19:
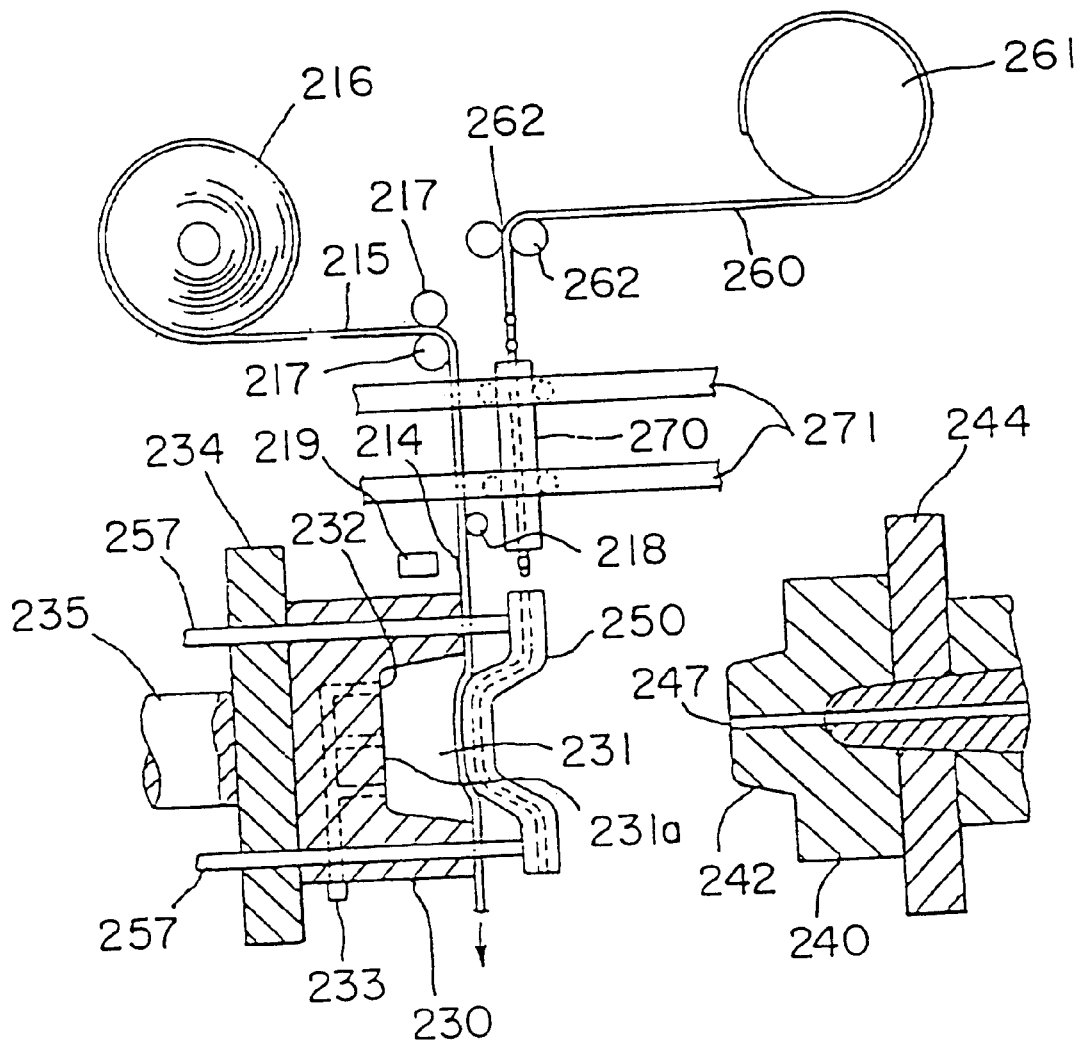
FIG. 19 is a schematic drawing to show an apparatus for effecting injection-molded-in foil decoration in the second embodiment of the present invention.

FIG. 19 is a schematic drawing to show the second embodiment of the present invention. In the drawing, hatched portions show cut surfaces. The apparatus of the present embodiment is provided with a female die 230 and a male die 240 arranged to be opposed to the female die 230 similarly as in the conventional example. Further, it is provided with a decoration sheet 215 unwound from a decoration sheet feed roll 216, a sheet clamp 250 having functions to support the decoration sheet 215 and also to house and retain a flexible sheet heating body 260, and the flexible sheet heating body 260 is used for generating heat for heating and softening the decoration sheet 215.

Formed in the female die 230 is a cavity 231 having a molding cavity surface 231a corresponding to the contour of the molded body to be molded, and a plurality of suction ports 232 opening on the cavity surface 231a are formed inside the female die 230. The suction ports 232 are connected to an unrepresented vacuum pump through a suction tube 233. The male die 240 is fixed to a stationary platen 244 and the female die 230 is connected to a hydraulic cylinder 235 through a moving platen 234, whereby the female die 230 can be movable relative to the male die 240. Further, as in the conventional case, the male die 240 has a core 242, which is to be inserted into the molding cavity 231 of the female die, and a pouring port 247 of a molten-resin-injecting unit is formed therein.

Figure 20:
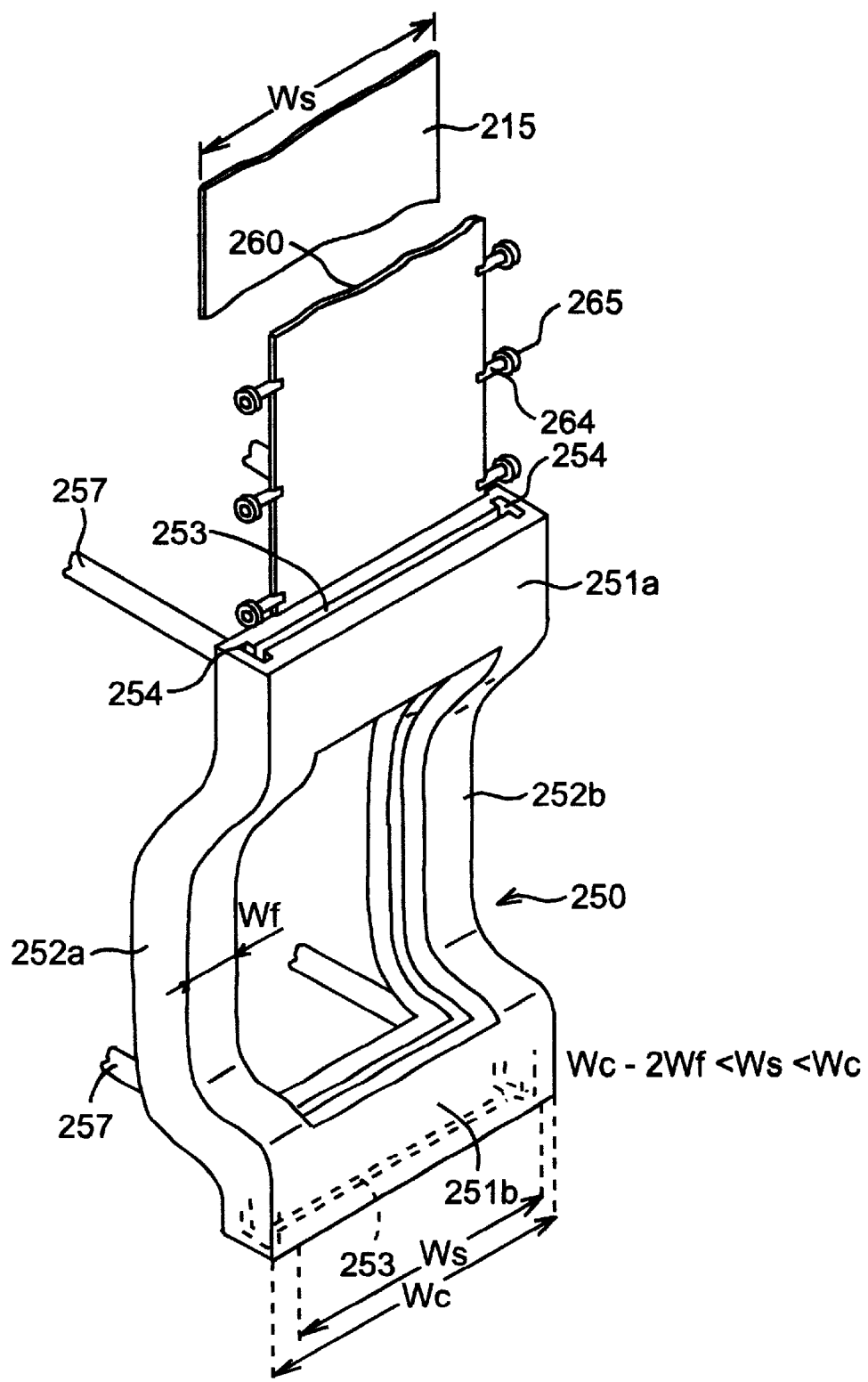
FIG. 20 is a perspective view of a sheet clamp frame shown in FIG. 19.

The sheet clamp 250 is a frame member made of, for example, stainless steel, which is fixed to slide rods 257 attached to the female die 230 and which is driven by an unrepresented driving mechanism so as to move away from the cavity surface 231a toward the male die 240. As shown in FIG. 20, the sheet clamp 250 has a slit 253 for the flexible sheet heating body 260 to be inserted into and guide grooves 254 for guiding rollers 265 fixed to the both side edges of the sheet heating body 260. This slit 253 opens on the inserting side of the sheet heating body 260 as illustrated (upward in FIG. 20), and is a cavity expanding in the feeding direction of the sheet heating body in the sheet clamp 250. Further, the slit 253 may be arranged either to or not to penetrate upper and lower stop frames 251a, 251b of the sheet clamp 250. Curved right and left stop frames 252a, 252b have a level difference smaller than that of the cavity surface 231a of the molding cavity 231, and a curvature equal to or smaller than that of the cavity surface 231a of the cavity 231, and retain the decoration sheet 215 in such a state that the sheet 215 is pushed into the cavity 231.

Figure 21:
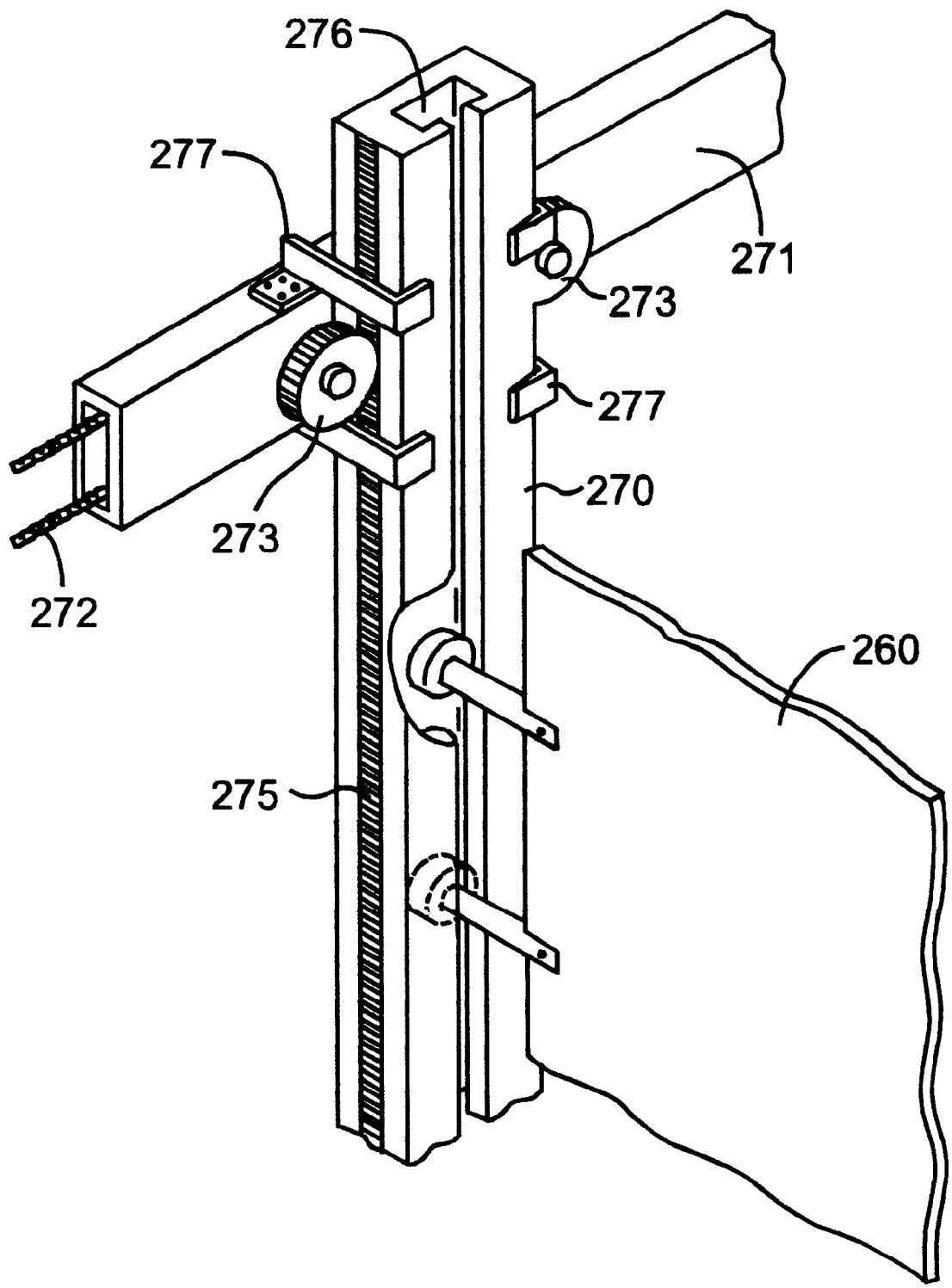
FIG. 21 is a drawing to illustrate a guide rail for a sheet heating body.

The flexible sheet heating body 260 is obtained by adhering to a thin elastic steel plate, a sheet heater, such as one formed in such a manner that a heating element constituted for example by spirally winding a fine resistance wire around a glass fiber cord is arranged in a sheet form in accordance with a predetermined pattern, the sheet is set between two thin silicone rubber sheets reinforced with glass fibers, and the resultant is then vulcanized, or a sheet heater formed in such a manner that a coating layer of resistor is formed on a heat resistant resin substrate and the surface is covered by an electrically insulating layer. The heating body has the thickness of about from 0.5 to 2 mm and is arranged to obtain a uniform temperature distribution with supply of an electric current. Further, the flexible sheet heating body 260 may be composed of a plurality of rectangular hot platens connected by hinges. Shafts 264 are fixed to the both side edges of the flexible sheet heating body 260 throughout a predetermined length from the lower end portion by means of screwing, and rollers 265 are attached as rotatable each to the tips of the shafts 264. The rollers 265 are guided in guide grooves 276 of sheet heating body guide rails 270, as shown in FIG. 21. Further, guide members which are guided as not rotating but sliding in the guide grooves may be used in place of the rollers 265.

Next described is a process for effecting foil decoration at the same time as injection molding, using the apparatus of the present embodiment.

As shown in FIG. 19, the decoration sheet 215 is drawn out from the feed roll 216 by the pair of lead-on rollers 217, 217, and is guided by the guide roller 218, thereby running in front of the female die 230. The end of the decoration sheet is pulled in toward the arrow direction by an unrepresented means so that the decoration sheet 215 may be kept not loosened. Desired patterns are printed at a predetermined pitch on the decoration sheet 215. In the case that the sheet is either a reverse printing bonded and layered sheet or a transfer sheet, the printed surface is set on the opposite side to the female die 230; in the case of a normal printing bonded and layered sheet, the printed surface is set on the female die 230 side. Further, positioning marks 214 (for example, register marks, cross marks, rectangles, stripes, etc.) are printed at a predetermined pitch or in an endless manner (as stripe patterns) on the decoration sheet 215 together with the patterns.

First, the decoration sheet 215 is unwound by a length of one shot from the feed roll 216 by the lead-on rollers 217, 217 in such a state that the sheet clamp 250 is placed apart from the female die 230 by the slide rods 257.

This one-shot unwinding and positioning of a pattern relative to the female die 230 is completed by stopping the drive of the sheet when a position sensor 219 such as a phototube detects the mark 214 on the sheet. In order to enable positioning in the longitudinal and lateral directions of the decoration sheet 215, it is ordinary practice to set vertical and horizontal pairs of position sensors, for example. Further, in the case that the patterns of the decoration sheet 230 are a single-colored pattern over the entire surface, which does not require positioning, this positioning step and printing of the positioning marks on the decoration sheet can be omitted.

Next, the slide rods 257 are drawn back toward the female die 230 to withdraw the sheet clamp 250 toward the female die 230, and the decoration sheet 215 is fixedly retained between the upper and lower stop frames 251a, 251b of the sheet clamp 250 and the parting surface of the female die 230. At the same time, the decoration sheet 215 is pushed into the molding cavity 231 by the right and left stop frames 252a, 252b of the sheet clamp 250, thereby being deformed into the shape having a level difference smaller than that of the cavity surface 231a of the cavity 231 and a curvature equal to or smaller than that of the cavity surface. Then, the sheet clamp 250 is incorporated with the female die 230 to constitute a part thereof.

The shape, the curvature, etc. of the right and left stop frames 252a, 252b of the sheet clamp 250 are so designed that no wrinkle or no breakage appears in the deformed decoration sheet 215 projecting into the cavity 231 when pushed thereby, similarly as in the first embodiment. Further, a preferred embodiment capable of particularly reducing wrinkles on the decoration sheet 215 may be arranged in such a manner that the upper and lower stop frames 251a, 251b of the sheet clamp 250 are formed in a flat plate shape with no curvature; the width Wc of the sheet clamp frame body 250 is set to be wider than the width Ws of the decoration sheet 215; the both side ends of the decoration sheet 215 are in contact with the right and left stop frames 252a, 252b over about a half of the overall width thereof Wf; and the decoration sheet 215 is not out from the both sides of the stop frames 252a, 252b (Wc−2Wf<Ws<Wc). This arrangement makes the decoration sheet 215 curved only in one direction (in the vertical direction in FIG. 20), which hardly forms a wrinkle on the decoration sheet 215. In this case, the cavity surface 231a of the molding cavity 231 may have a shape curved in two or more directions (for example, in the vertical and horizontal directions), whereby the same effects can be achieved.

Figure 22:
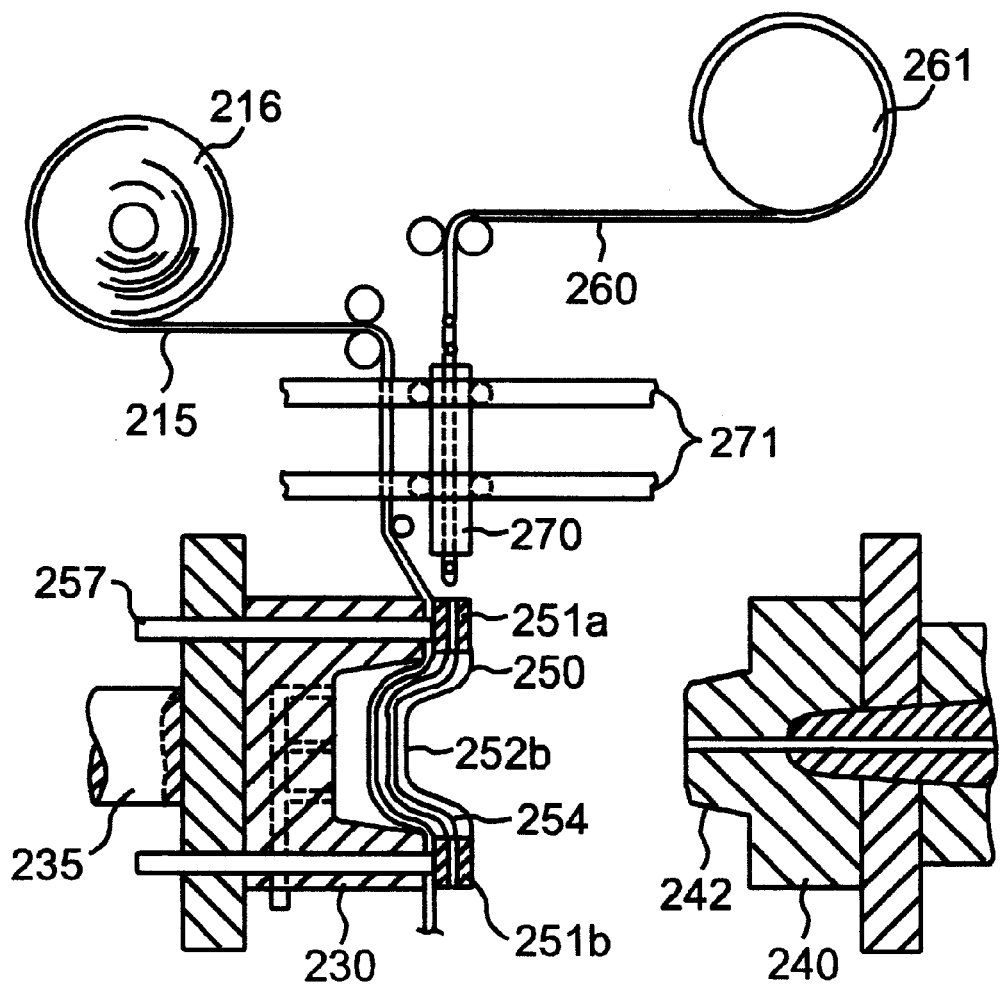
FIG. 22 is a drawing to illustrate a step of inserting a flexible sheet heating body into the sheet clamp.
Figure 23:
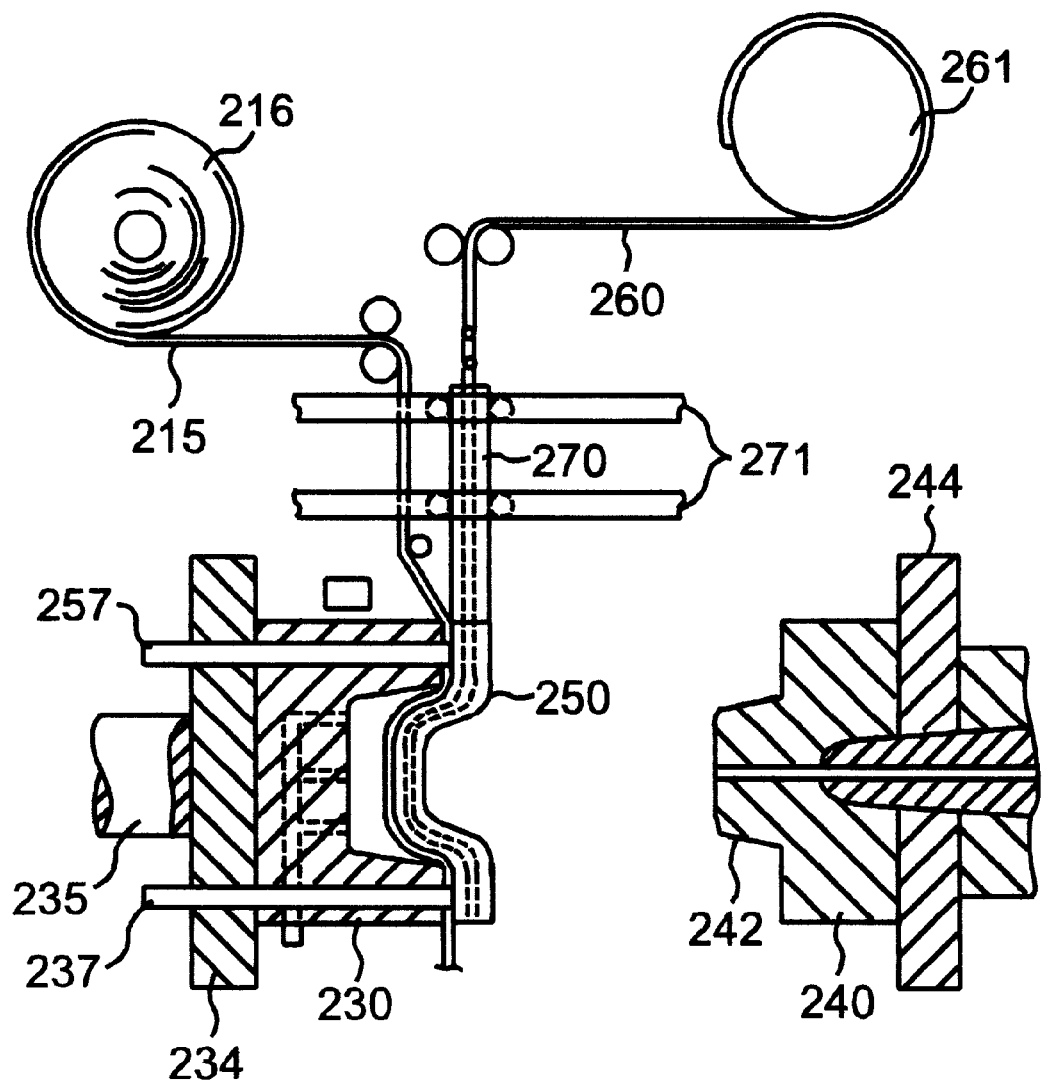
FIG. 23 is a drawing to illustrate the step of inserting the flexible sheet heating body into the sheet clamp.

Next, the female die 230 is advanced toward the male die 240 by driving the hydraulic cylinder 235, and it is stopped at a position where the top end of the sheet clamp 250 is located right under the bottom ends of the guide rails 270 for the sheet heating body 260, as shown in FIG. 22. Then, the guide rails 270 for the sheet heating body 260 are lowered to bring the bottom ends of the guide rails 270 of the sheet heating body 260 and the top end of the sheet clamp 250 into contact with each other as shown in FIG. 23, thereby continuously joining the guide grooves 276 of the guide rails 270 of the sheet heating body 260 with the guide grooves 254 of the sheet clamp 250.

As shown in FIG. 21, housings 271 for fixing and transferring the guide rails are fixed to the molding machine and the guide rails 270 for the sheet heating body 260 are retained by stop fittings 277 so as to be movable up and down relative to the housings 271. The guide rails 270 move downward when a chain 272 set in the housing 271 is driven by an unrepresented power source such as an electric motor. When the chain 272 is driven, pinions 273 attached to the housing 271 rotate. The pinions 273 mesh with racks 275 formed on the side surfaces of the guide rails 270, and the guide rails 270 descend with rotation of the pinions 273.

Next, a pair of lead-on rollers 262, 262 are driven to unwind a winding and unwinding roller 261 for the sheet heating body 260 and to feed the flexible sheet heating body 260 out. The flexible sheet heating body 260 thus fed out is inserted into the slit 253 of the sheet clamp 250 while the rollers 265 at the both side edges are guided by the guide grooves 254, thereby changing into a curved shape along the shape of the sheet clamp 250. Since the bottom ends of the guide rails 270 for the sheet heating body and the top end of the sheet clamp 250 are in contact with each other as described above, the flexible sheet heating body 261 is smoothly introduced into the sheet clamp 250. The feeding driving of the sheet heating body 260 is stopped when the flexible sheet heating body 260 comes to be set over the entire surface of the sheet clamp 250. In this case, a necessary function is to cover the entire aperture enclosed by the upper and lower and right and left stop frames 251a, 251b, 252a, 252b in the center of the sheet clamp 250 with the sheet heating body 260. It is not necessarily required that the sheet heating body 260 penetrate the lower stop frame 251b. In this state, the flexible sheet heating body 260 inserted and retained in the slit 253 of the sheet clamp 250 becomes a curved hot platen having the same or substantially the same shape as that of the decoration sheet 215 pushed and deformed by the sheet clamp 250.

Figure 24:
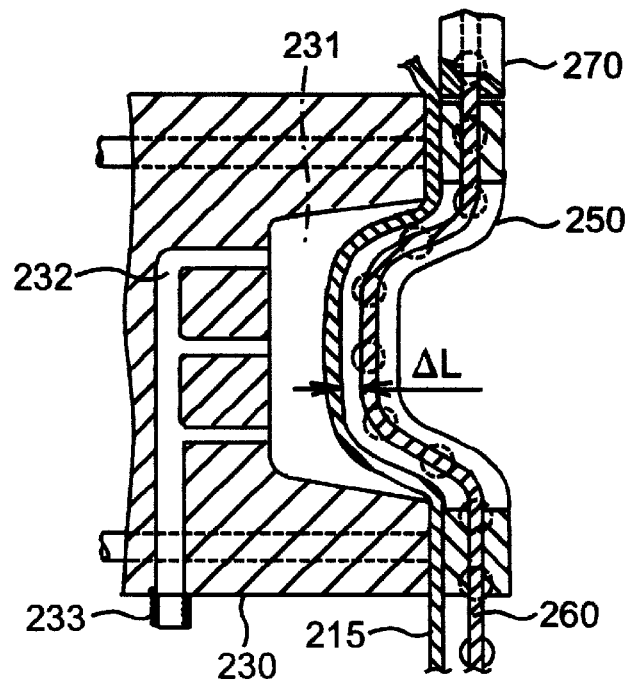
FIG. 24 is a drawing to illustrate a step of heating and softening the decoration sheet.

The distance ΔL between the decoration sheet 215 and the sheet heating body 260 is kept constant as shown in FIG. 24. An electric current is supplied to the flexible sheet heating body 260 in this state, thereby heating and softening the entire surface of the decoration sheet 215 uniformly. After completion of heating and softening of the decoration sheet 215, the inside of the molding cavity 231 of the female die 230 is evacuated through the suction ports 232 by operating the unrepresented vacuum pump, whereby the softened decoration sheet 215 pushed and retained by the sheet clamp 250 is drawn into close fit to the molding cavity surface 231a.

At this time, the flexible sheet heating body 260 is wound back by the winding and unwinding roller 261 for the sheet heating body, whereby the heating body 260 is withdrawn out of the slit 253 of the sheet clamp 250 upward, and further, the chain 272 in the housing 271 is driven in the reverse direction. By this operation, the pinions 273 are driven in the reverse direction and an action of the racks 275 meshed with the pinions 273 retracts the guide rails 270 for the sheet heating body 260 to an upward position where they do not hinder clamping of the female and male dies 230, 240. Thus, the flexible sheet heating body 260 and the guide rails 270, which could obstruct coupling of the female and male dies 230, 240 and injection of a molten resin, both are withdrawn from the female and male dies 230, 240.

According to the premolding step of the present invention, the decoration sheet 215 is preliminarily made to be projected and deformed in the molding cavity 231 of the female die 230 by the sheet clamp 250, the decoration sheet 215 is heated and softened in that state, and thereafter it is shaped into fit to the molding cavity surface 231a. This decreases a deformation amount (stretching amount) of the softened decoration sheet 215 and a stretching speed when the sheet is drawn into close fit to the cavity surface 231a, which can reduce distortion, wrinkles, and breakage of the decoration sheet 215 and positional deviation between the pattern and the contour of the molded article.

Figure 25:
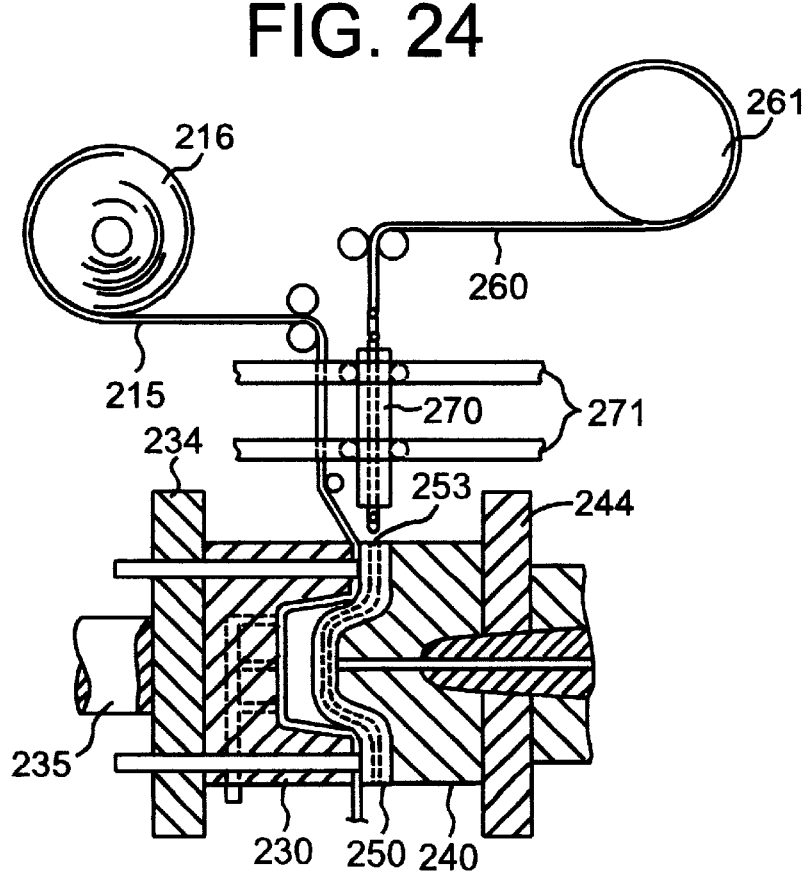
FIG. 25 is a drawing to illustrate a step of clamping the female and male dies.

Next, the female die 230, in which the sheet clamp 250 is incorporated as a constituent, is further advanced by the hydraulic cylinder 235, so that the female die 230 comes to couple with the male die 240 to effect die clamping, as shown in FIG. 25, and thereafter the molten resin is poured to fill in the cavity 231 through the pouring port 247 of the injecting unit formed in the male die 240, thereby effecting injection molding. The molten resin is poured to fill through the aperture of the sheet clamp 250. At this time, the slit 253 exposed to the aperture of the sheet clamp frame body 250 is closed by the core 242 of the male die 240, and, therefore, no molten resin goes into the slit 253 or the guide grooves 254 of the sheet clamp 250. After the injected resin is cooled and solidified in this state, the decoration sheet 215 in the female die 230 becomes adhering to the injected resin as incorporated therewith.

The injected resin may be a resin solution which is cured by a chemical reaction, such as a polyurethane using an isocyanate as a curing agent or an unsaturated polyester using an isocyanate, an organic sulfonate or the like as a curing agent in addition to a fluidized thermoplastic resin as heat-melted, such as a polyvinyl chloride, a polystyrene, an ABS resin, an acrylic resin, or a polycarbonate.

Figure 26:
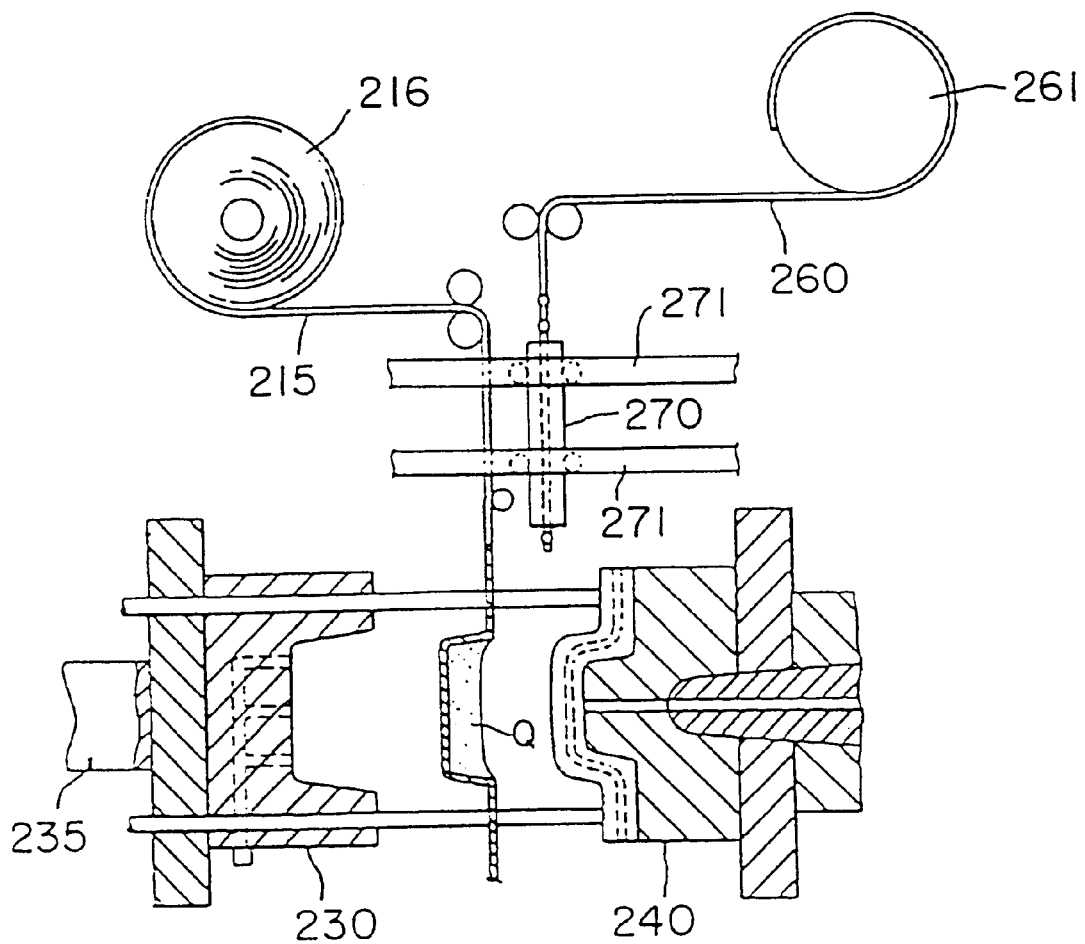
FIG. 26 is a drawing to illustrate a step of opening the female and male dies.

Next, as shown in FIG. 26, the female and male dies 230, 240 are opened to release a molded body with foil decoration Q from the dies. Here, if the decoration sheet 215 is a bonded and layered film (laminate film), the foil decoration is already performed as it is, and all the layers of the decoration sheet 215 are adhered to be integrated onto the surface of the molded body Q to form a decorative layer (FIG. 8A). On the other hand, in the case that the decoration sheet 215 is a transfer film, only a base sheet 215a of the decoration sheet 215 integrated on the surface of the molded body Q is peeled off in a later step so that a transfer layer 215b including a pattern layer, etc. may be left on the molded body Q side to form a decorative layer, thereby completing the foil decoration (FIG. 8B).

Immediately after the die opening, the molded body Q often remains adhering to the surface of the cavity 231a of the female die 230 or the surface of the male die 240. In order to release the molded body Q from the dies 230, 240, thereby certainly bringing it into the state of FIG. 26, a known ejector is used to facilitate release from the dies 230, 240, though it is not shown. As an example of the ejector, a slide rod may be set as capable of being projected and withdrawn in the male die 240 or the female die 230, which is projected after the die opening to release the molded body Q from the die. In the steps except for the releasing step, the slide rod is kept as withdrawn to such a position that the top surface thereof is located at the same level as the surface of the die.

According to the present embodiment, the flexible sheet heating body 260 is inserted into the sheet clamp 250 to be deformed into its shape, and, therefore, there is no need to prepare a hot platen for heating and softening the decoration sheet 215, separately from the sheet clamp 250. In other words, curved hot platens of various shapes can be constituted automatically by one type of the flexible sheet heating body 260 only by replacing the sheet clamp 250, which can obviate a need to produce a new hot platen for every shape of molded article Q. Further, since the sheet clamp 250 also serves as a hot platen, the surface of the hot platen changes with good precision into the same shape as the decoration sheet 215 preliminarily deformed, and the decoration sheet 215 can be heated uniformly at an equal distance. The weight of the hot platen becomes lighter than a hot platen made of a rigid body as employed in the conventional case, whereby the driving mechanism becomes simpler.

Modification 1

Figure 27:
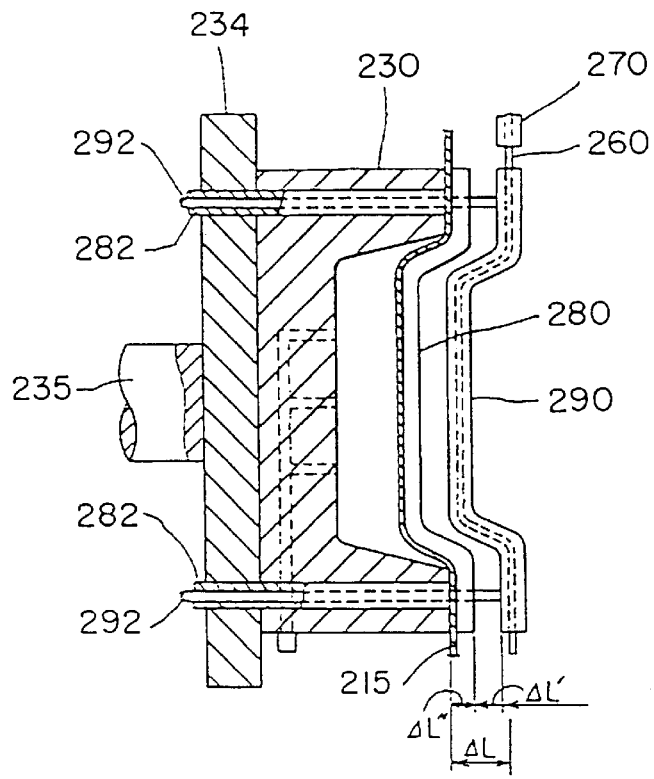
FIG. 27 is a drawing to illustrate another embodiment of the present invention.
Figure 28:
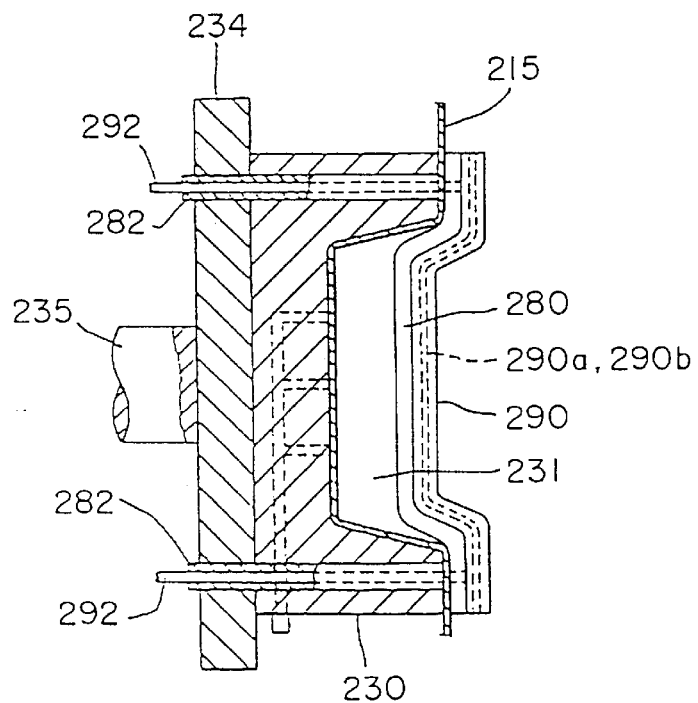
FIG. 28 is a drawing to illustrate another embodiment of the present invention.

Another example of modification of the apparatus for effecting foil decoration at the same time as injection molding according to the present invention is described referring to FIG. 27 and FIG. 28.

The present embodiment employs a sheet clamp 280 having only a function to fix and retain the decoration sheet 215 on the female die 230, and a frame body 290 for housing a sheet heating body, independent thereof. The two frame bodies 280, 290 are independently driven by separate slide rods formed in the female die 230. Namely, the sheet clamp frame body 280 is driven by slide rods 282 and the other frame body 290 is driven by slide rods 292 arranged as coaxial with the slide rods 282.

The sheet clamp 280 is a dedicated frame body for fixing and retaining the decoration sheet 215 on the female die 230, which has a shape similar to the sheet clamp 250 as shown in FIG. 20, and which has an aperture in the center, but has neither slit 253 nor guide grooves 254. On the other hand, the frame body 290 for housing the sheet heating body houses the flexible sheet heating body 260, and heating the decoration sheet 215 pushed by the sheet clamp 280 and thus stereoscopically deformed, as keeping it at an equal distance. It has substantially the same shape as the sheet clamp 280, and has a slit 290a for the flexible sheet heating body 260 to be inserted therein and guide grooves 290b for guiding guide rollers 265 provided at the both side edges of the flexible sheet heating body 260, as the sheet clamp 250 shown in FIG. 20 had.

The sheet clamp 280 remains still as keeping the decoration sheet 215 on the female die 230 until the molded article Q is taken out. On the other hand, after the frame body 290 for housing the sheet heating body houses the flexible sheet heating body 260 in the slit 290a, it is moved forward or backward through drive of the slide rods 292 to change a distance ΔL' between the two frames 280, 290, thereby changing the distance between the sheet heating body 260 and the decoration sheet 215, as shown in FIG. 27, which enables heating at an optimum distance for every one of various shapes of the decoration sheet 215 and molded article Q. Namely, supposing the thickness of the sheet clamp 280 is ΔL" and the distance between the sheet clamp 280 and the frame body 290 for housing the sheet heating body is ΔL', the distance ΔL between the decoration sheet 215 and the hot platen is given as ΔL=ΔL'+ΔL".

At the point of completion of the premolding of the decoration sheet 215 to the cavity surface 231a of the female die 230, the slide rods 292 for driving the frame body 290 for housing the sheet heating body are moved to bring the sheet clamp 280 into contact with the frame body 290 for housing the sheet heating body to be coupled therewith, as shown in FIG. 28, thereby determining the volume of the molding cavity 231 and sealing the sheet clamp 280 and the frame body 290 for housing the sheet heating body. Then, the female and male dies 230, 240 are coupled with each other to clamp the dies by the hydraulic cylinder 235, and injection of the molten resin is carried out.

According to the present embodiment, the distance L between the decoration sheet 215 and the sheet heating body 260 can be set to a desired length, so that optimum heating conditions can be advantageously set for each of various decoration sheets 215 and each of various molding shapes.

The decoration sheet 215 has a substrate sheet 215a and a decorative layer 215b laminated thereon. A final product is obtained as the substrate sheet 215a and the decorative layer 215b are integrated in fit with the molded article, or the transfer sheet 215b is left on the molded article side and the substrate sheet 215a is peeled off after the decoration sheet 215 and the molded article Q are once integrated with each other. The substrate sheet 215a applicable may be a thermoplastic resin such as a polyvinyl chloride, an acrylic resin, a polystyrene, an ABS resin, a polycarbonate, a polyester, a polypropylene, etc. The thickness of the substrate sheet 215a is usually in the range of from about 20 to about 500 μm. The decorative layer 215b may be a print pattern layer, a colored or transparent coating layer, or a metal thin film, etc.

The female die 230 and the male die 240 used in the apparatus for effecting injection-molded-in foil decoration of the present invention may have fundamentally the same structure as those in the conventional apparatus, and an uneven pattern or the like may be formed on the molding surfaces of the female die 230 and the male die 240 (whereby an uneven pattern is formed on the molded body accordingly). A material for the female die 230 and male die 240 may be a metal such as iron or a ceramic material. A suction path is preferably formed inside the female die 230 in order to draw the decoration sheet 215 softened by heating, an end of which is connected to a pressure reducing device such as a vacuum pump and the other end of which opens on the molding cavity surface 231a. Further, if the female die 230 is made of a porous ceramic or a porous metal, the porous structure itself may be used as the suction path and suction port.

The decoration sheet 215 may be supplied in a necessary amount from a continuous band film wound in the coil form or may be supplied as batch sheet films preliminarily cut into in a predetermined size.

The injection molding according to the present invention includes the reactive injection molding (so-called RIM molding), for injecting an uncured solution of a curing type resin to be cured by a chemical reaction, in addition to the method for injecting a heat-melted thermoplastic resin. In the case of the reactive injection molding, a resin "solution" which is not heat-melted is used. Accordingly, the "molten resin" in the present specification includes a solution of the above resin in addition to the resin in a heat-melted state.

By the process and apparatus for effecting injection-molded-in foil decoration of the present invention, the decoration sheet 215 can uniformly be heated and softened without irregularity. Further, the deformation amount can be reduced in premolding of the decoration sheet 215 heated and softened into the molding cavity surface 231a of the female die 230, which decreases distortion, appearance of wrinkles and breakage of the decoration sheet 215, positional deviation between the decorative layer 215b and the contour of the molded article, and distortion of the decorative layer 215b. Accordingly, the foil decoration can be effected in high quality to the molded article having large level differences or large curvature of the surface. Further, the surface shape of the hot platen 260 becomes the same with good precision as the decoration sheet 215 preliminarily deformed, and the decoration sheet 215 can be heated uniformly at an equal distance. The hot platen becomes lighter in weight than a hot platen made of a rigid body as employed in the conventional case, whereby the driving mechanism becomes simpler.

Third Embodiment

Below described is the third embodiment of the present invention, referring to drawings. FIG. 29 to FIG. 43B are drawings to show the process and apparatus for effecting injection-molded-in foil decoration according to the present invention.

Figure 29:
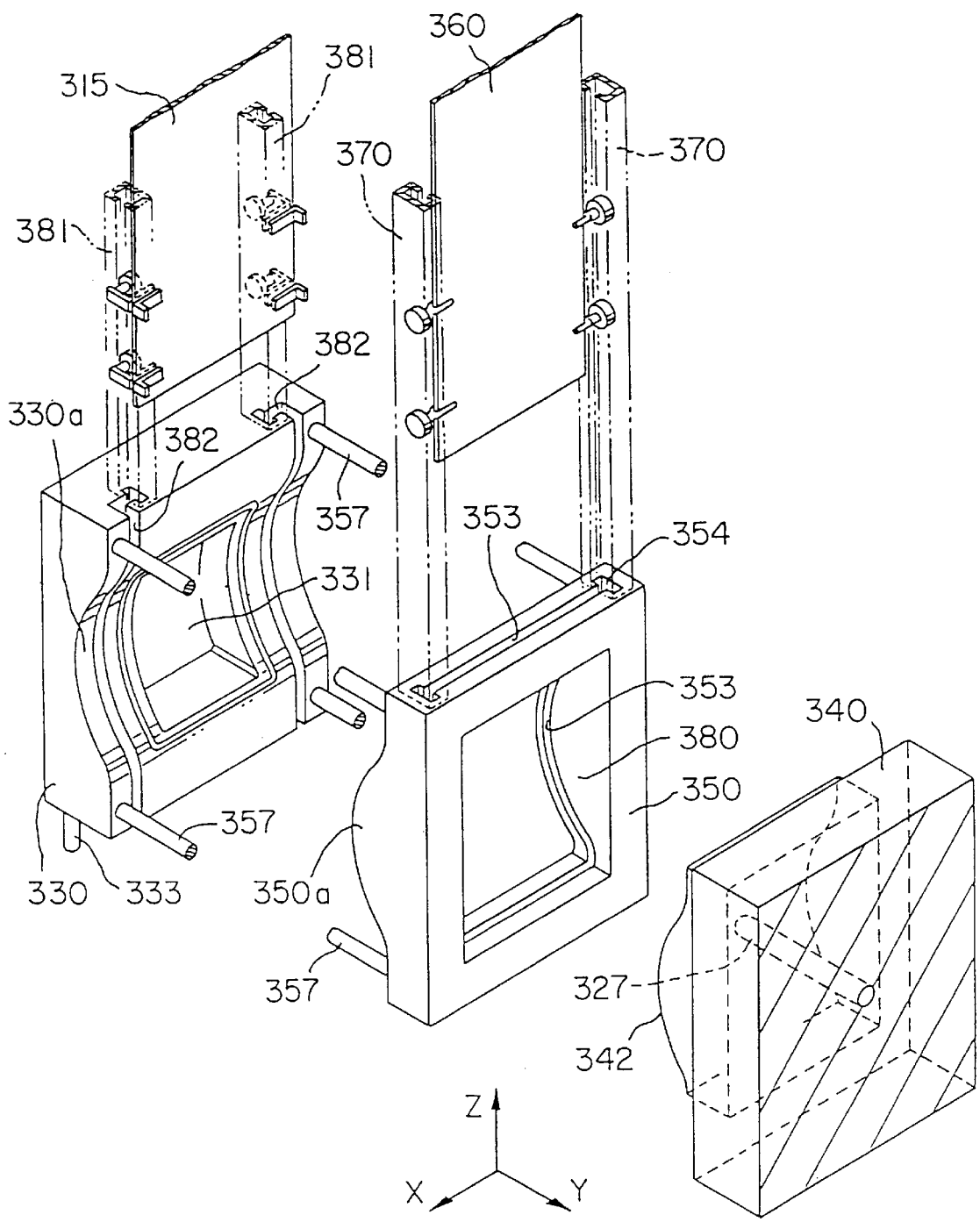
FIG. 29 is a schematic perspective view to show an apparatus for effecting injection-molded-in foil decoration in the third embodiment of the present invention.
Figure 30:
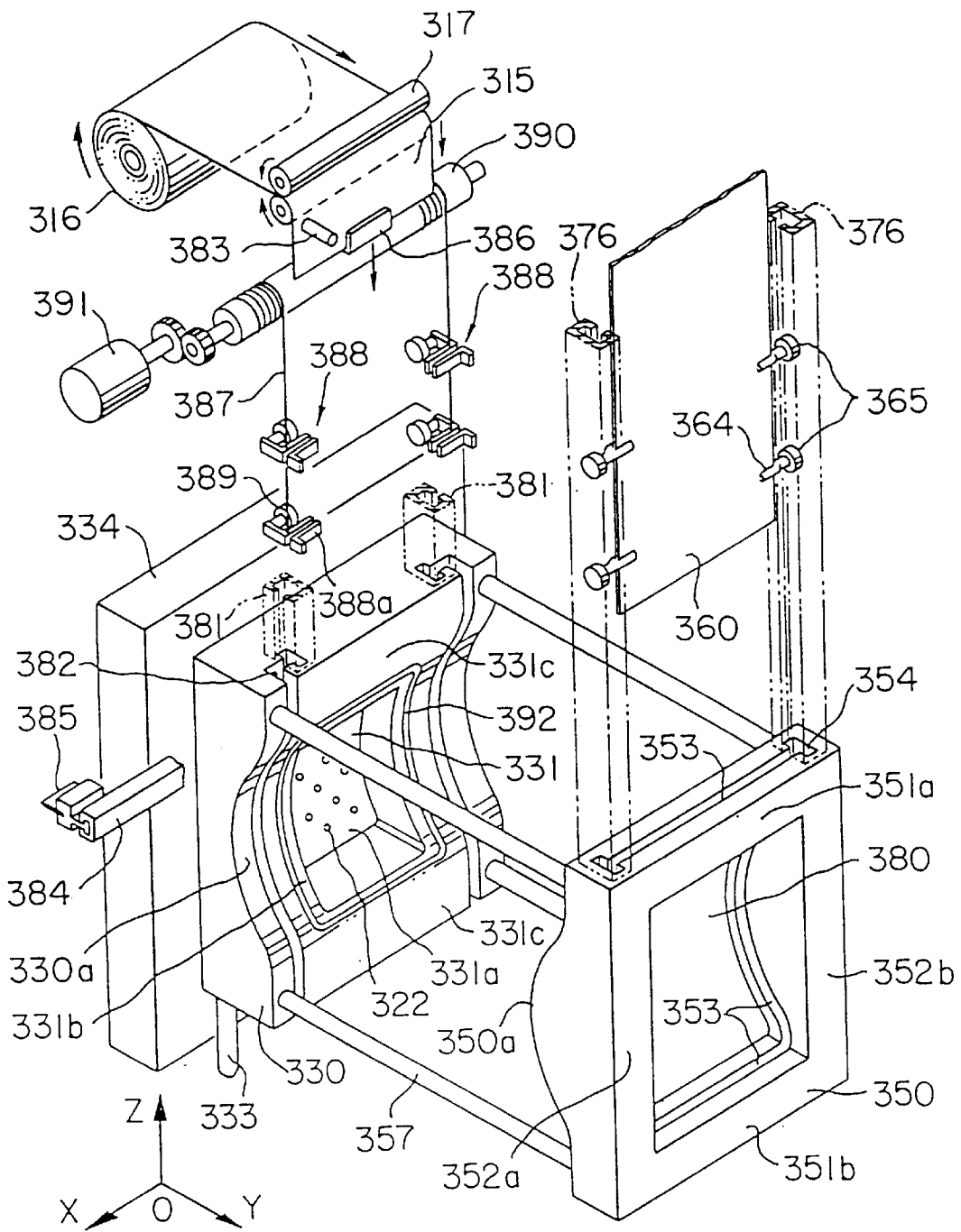
FIG. 30 is an operational drawing of the apparatus for effecting injection-molded-in foil decoration according to the present invention.

First, the apparatus for effecting injection-molded-in foil decoration is described with reference to FIG. 29 to FIG. 34. As shown in FIG. 29, the apparatus for effecting injection-molded-in foil decoration is provided with a cavity 331 having a cavity surface 331a, a female die 330 having suction ports 322 opening on the cavity surface 331a, and a male die 340 arranged to be opposed to the female die 330 and having a core 342 and a resin pouring port 327. The cavity surface 331a of the female die 330 is of a semicylindrical shape with the center axis on the x axis. Further, as shown in FIG. 29 and FIG. 30, a sheet clamp 350 is formed between the female die 330 and the male die 340, as retaining a decoration sheet 315 in cooperation with a cavity periphery 331b of the female die 330.

The sheet clamp 350 has right and left stop frames 352a, 352b, and top and bottom stop frames 351a and 351b, and an aperture 380 as enclosed by these stop frames 352a, 352b, 351a, 351b is formed. Further, a semicircular curved projection 350a with the center axis on the x axis is formed so as to project in each of the right and left stop frames 352a, 352b of the sheet clamp 350. Furthermore, a slit 353 is formed in the sheet clamp 350 in order that a flexible sheet heating body 360 described below is inserted therein so as to be curved substantially in the same shape as that of the decoration sheet 315 retained on the female die 330. This slit 353 opens on the insertion side of the sheet heating body 360 (upward in FIG. 29), as shown in the drawing, and expands in the feed direction of the sheet heating body 360 (downward in FIG. 29). Further, guide grooves 354 are formed along the both side edges of the sheet clamp 350. This slit 353 may or may not penetrate the bottom stop frame 351b of the sheet clamp 350 as long as the sheet heating body 360 can cover the aperture 380. Furthermore, the sheet clamp 350 is connected to the female die 330 through slide rods 357, and the sheet clamp 350 is arranged to move toward or away from the female die 330 through the slide rods 357, which slide as penetrating the external parting surface of the cavity 331 of the female die 330.

The surface of the cavity periphery of the female die 330 (which is generally called as a parting surface) has top and bottom parting surfaces 331c, 331c, which are to match (fit) with the top and bottom stop frames 351a, 351b located at the top and the bottom of the sheet clamp 350 and opposed thereto, and right and left parting surfaces 331b, 331b, which are to match the curved projections 350a, 350a located right and left of the sheet clamp 350 and opposed thereto. Each of the right and left parting surfaces 331b, 331b is provided with a semicircular, curved recess 330a with the center axis on the x axis, corresponding to the projection 350a of the sheet clamp 350, and a pair of sheet guide grooves 382 are formed in the surfaces of the curved recess 330a. The depth of the curved recess 330a of the female die 330 from the top and bottom parting surfaces 331c is determined to be substantially the same as the height of the projections 350a of the sheet clamp 350, but it is smaller than the depth of the cavity surface 331a. Further, the curvature of the recess 330a of the female die 330 is smaller than that of the cavity surface 331a. Furthermore, in the top, bottom, right and left parting surfaces of the female die 330, the periphery close to the cavity 331 is called as a cavity periphery. A ring groove 392a (see FIG. 37) is formed here, and an O ring 392 is fit in the ring groove 392a. A suction tube 333 is provided in communication with suction ports 322 in the female die 330.

Further, a decoration sheet feed roll 316 is arranged above the female die 330 in order to successively supply an elongate band-shaped decoration sheet 315, and the decoration sheet 315 from the decoration sheet feed roll 316 is supplied toward the cavity 331 of the female die 330 through lead-on rollers 317, 317. Furthermore, the decoration sheet 315, supplied to the cavity 331 of the female die 330 through the lead-on rollers 317, 317, is so arranged that the both side edges are pinched by sheet pinching means 388.

The sheet pinching means 388 is fixed to wires 387 unwound from a sheet pinching means feed roll 390, and the wires 387 are unwound by rotating the sheet pinching means feed roll 390 by an electric motor 391 to draw the sheet pinching means 388. A sheet pinching means 388 has a pair of pinching members 388a, 388a for pinching the either side edge of the decoration sheet 315 and a roller (guide member) 389 connected to the pair of pinching members 388a, 388a, among which the roller 389 is arranged to go into a sheet guide rail 381 and then go into the sheet guide groove 382 of the female die 330.

Then the decoration sheet 315 sent downward from the lead-on rollers 317 is pulled downward as held by a pulling chuck 386 after the tip end thereof is detected by a position sensor 383. This pulling chuck 386 moves in the sheet feed direction (in the vertical (Z) direction in FIG. 30) by means of a cylinder mechanism or the like, which is not shown.

Further, a cutter guide rail 384 is arranged in the horizontal direction above the female die 330, and a sheet cutter 385 is arranged so to run along the cutter guide rail 384.

Furthermore, the sheet heating body 360 is arranged to be inserted into the slit 353 of the sheet clamp 350, and the both side edges of the sheet heating body 360 are pinched by clamp members 364. Rollers 365 are connected to the clamp members 364. The rollers 365 are inserted into the grooves 376 of the guide rails 370 set above the sheet clamp 350, and then the rollers 365 enter the guide grooves 354 in the sheet clamp 350 from the guide rails 370.

Next, the sheet pinching means 388 is described in detail with reference to FIG. 35 to FIG. 38. As shown in FIG. 35 to FIG. 38, a sheet pinching means 388 has a pair of sheet pinching members 388a, 388a connected to each other as rockable about a pivot 387, and a return spring 396 between the pair of pinching members 388a, 388a, and the roller 389 is connected to one pinching member 388a. On the other hand, a projection 395 is formed at the end of the other pinching member 388a.

Incidentally, the female die 330 described above is fixed to a moving platen 334, and the female die 330 fixed to the moving platen 334 is arranged to move toward the male die 340, which is fixed to a stationary platen 344. Further, the decoration sheet feed roll 316 and the sheet pinching means feed roll 390 are fixed to the moving platen 334, though not shown, and thus, they are arranged to move together with the female die 330. Also, the guide rails 370 are arranged to move together with the sheet clamp 350.

Next described is the operation of the present invention in the above constitution.

FIG. 30 shows a state of starting a next molding cycle after finishing a previous molding cycle. In FIG. 30, the female die 330 and the male die 340 (not shown in FIG. 30) are separate from each other, and the sheet clamp 350 is also separated from the female die 330 by projection of the slide rods 357. The flexible sheet heating body 360 is waiting above the sheet clamp 350. Further, the decoration sheet 315 is unwound from the decoration sheet feed roll 316 so that the tip end of the decoration sheet 315 may be located at a position where it is fed out from the lead-on rollers 317. Furthermore, the tip end of the decoration sheet 315 is pinched by the pulling chuck 386.

Further, as shown in FIG. 30, a plurality of sheet pinching means 388 are connected at predetermined intervals to the wires 387 unwound from the sheet pinching means feed roll 390, and the width between the wires 338 is slightly wider than that of the decoration sheet 315. Also, the pinching members 388a, 388a of each sheet pinching means 388 are waiting in an open state above the female die 330.

Next, a new molding cycle is started from such a state. Namely, as shown in FIG. 30, the elongate band-shaped decoration sheet 315 is unwound from the decoration sheet feed roll 316 and the tip end of the decoration sheet 315 is detected by the position sensor 383. Then the tip end of the decoration sheet 315 is pulled downward (in the z direction) by the pulling chuck 386, and the tip end of the decoration sheet 315 reaches a position lower than the lowest out of the sheet pinching means 388. At that time, the both side edges of the decoration sheet pass between the pinching members 388a, 388a which are kept open.

Figure 31:
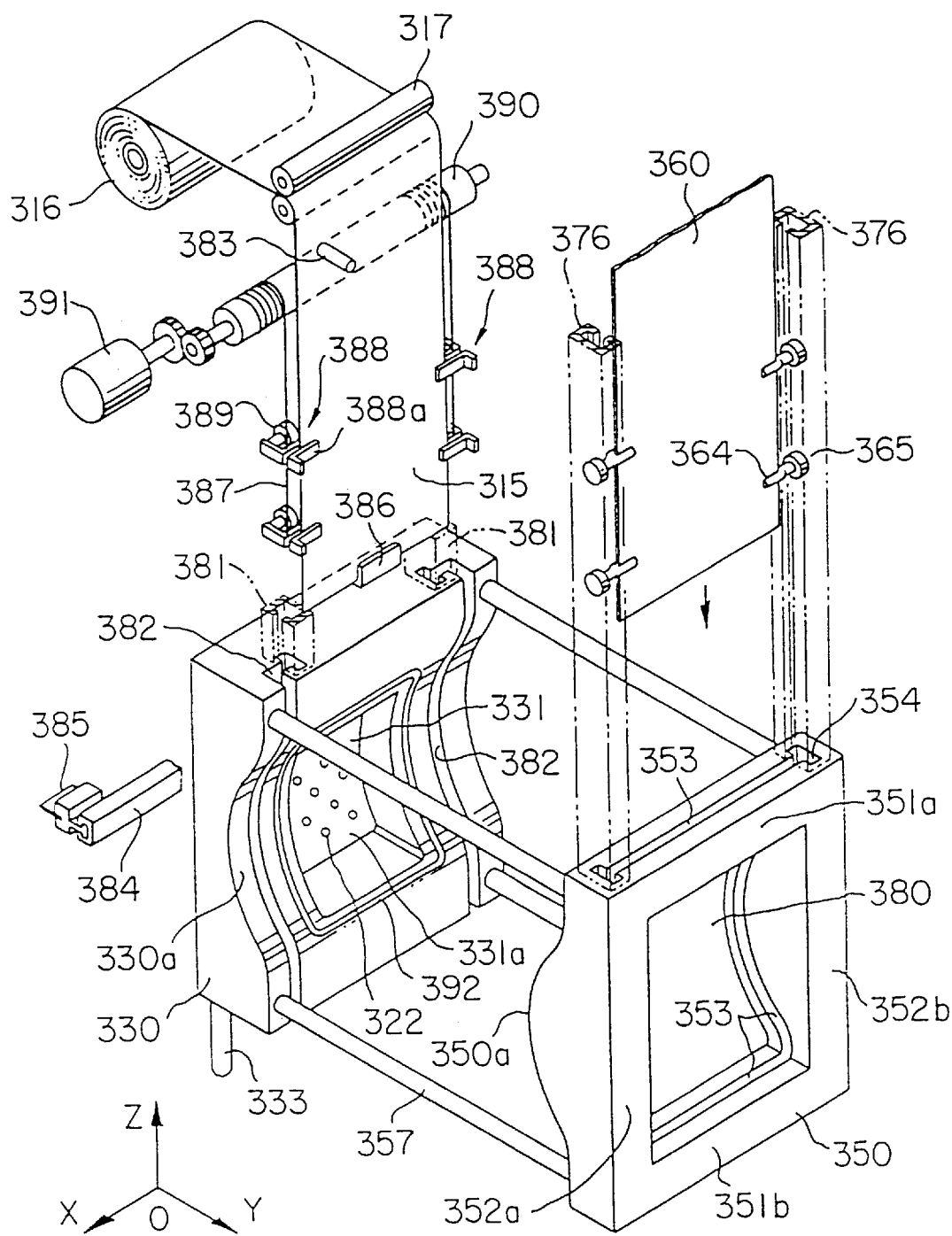
FIG. 31 is an operational drawing of the apparatus for effecting injection-molded-in foil decoration according to the present invention.

Next, the paired pinching members 388a, 388a of each sheet pinching means 388 are closed to pinch the either side edge of the decoration sheet 315 between the paired pinching members 388a, 388a, as shown in FIG. 31.

Figure 38:
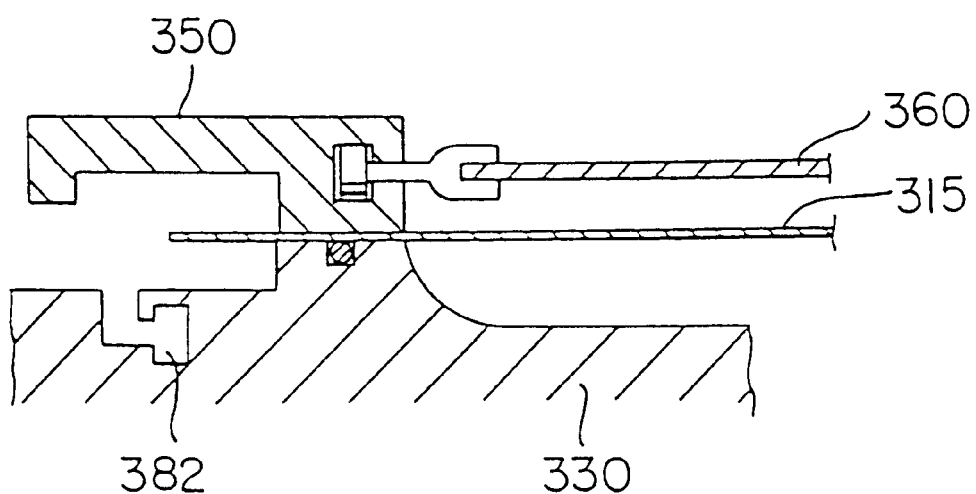
FIG. 38 is a sectional view to show the operation of the sheet pinching means.

In this case, each sheet pinching means 388 operates as follows: the projection 395 at the tip of the one pinching member 388a is first pushed by a driving means such as a solenoid or a hydraulic cylinder to open the pair of pinching members 388a, 388a, as shown in FIG. 38. Next, the both side edges of the decoration sheet 315 are inserted between the pair of pinching members 388a, 388a, and then the driving means is released to close the pair of pinching members 388a, 388a by the return spring 396.

At the same time, as shown in FIG. 31, the sheet heating body 360 is lowered and the rollers 365 connected to the clamp members 364 for pinching the both side edges of the sheet heating body 360 go into the guide grooves 354 of the sheet clamp 350 from the grooves 376 of the guide rails 370. When the rollers 365 enter the guide grooves 354 in this manner, the sheet heating body 360 comes into the slit of the sheet clamp 350.

Figure 32:
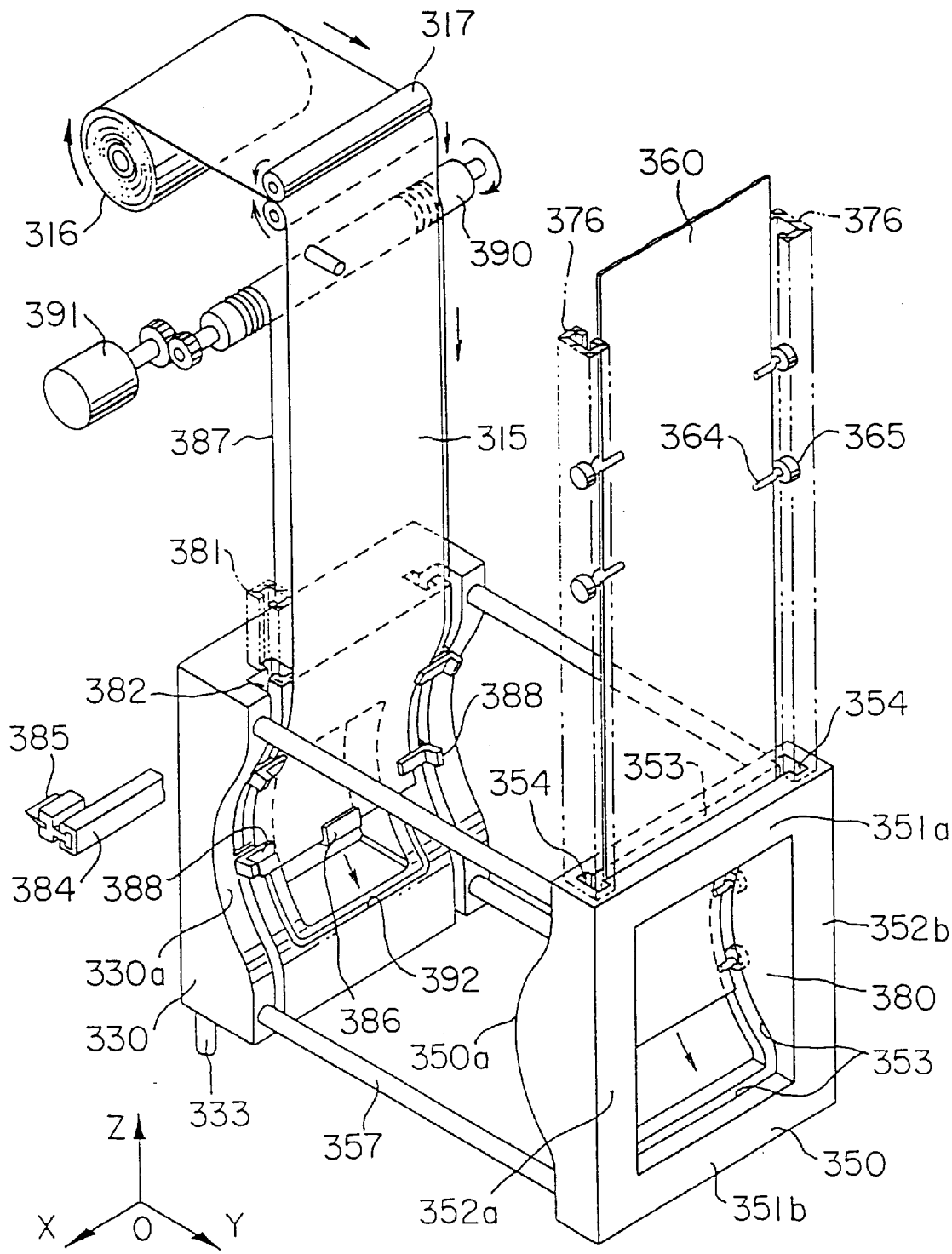
FIG. 32 is an operational drawing of the apparatus for effecting injection-molded-in foil decoration according to the present invention.

Then, as shown in FIG. 32, the tip end of the decoration sheet 315 is further pulled down by the pulling chuck 386. In this case, the roller 389 of each sheet pinching means 388 enters the sheet guide groove 382 of the female die 330, whereby the sheet decoration sheet 315 is becoming curved along the surfaces of the grooves 330a of the female die 330 accordingly.

As shown in FIG. 29 to FIG. 33, the shape of the recess 330a of the female die 330 is similar to the shape of the cavity 331 of the female die 330, but the depth of the recess 330a from the top and bottom parting surfaces 331c, 331c is smaller than the depth of the cavity 331. Further, the curvature is arranged to be the same as or smaller than that of the cavity surface 331a. Therefore, the decoration sheet 315, which is curved along the surfaces of the recess 330a of the female die 330, is in such a state that it is substantially along the cavity surface 331a. Thus, the cavity 331 of the female die 330 is covered by the decoration sheet 315. At that time, the depth and the radius of curvature of the recess 330a are preferably so determined that the depth is as deep as possible and the curvature is substantially at the same level as that of the cavity surface 331a within the range enough for the decoration sheet 315 to be deformed with neither wrinkle nor breakage when it is curved without heating and softening.

At the same time, as shown in FIG. 32, the rollers 365 connected to the clamp members 364 for pinching the sheet heating body 360 go into the guide grooves 354 of the sheet clamp 350. In this case, the sheet heating body 360 is curved substantially in the same shape as the projections 350a of the sheet clamp 350, that is, substantially in the same shape as the decoration sheet 315 on the surfaces of the recess 330a of the female die 330.

Figure 33:
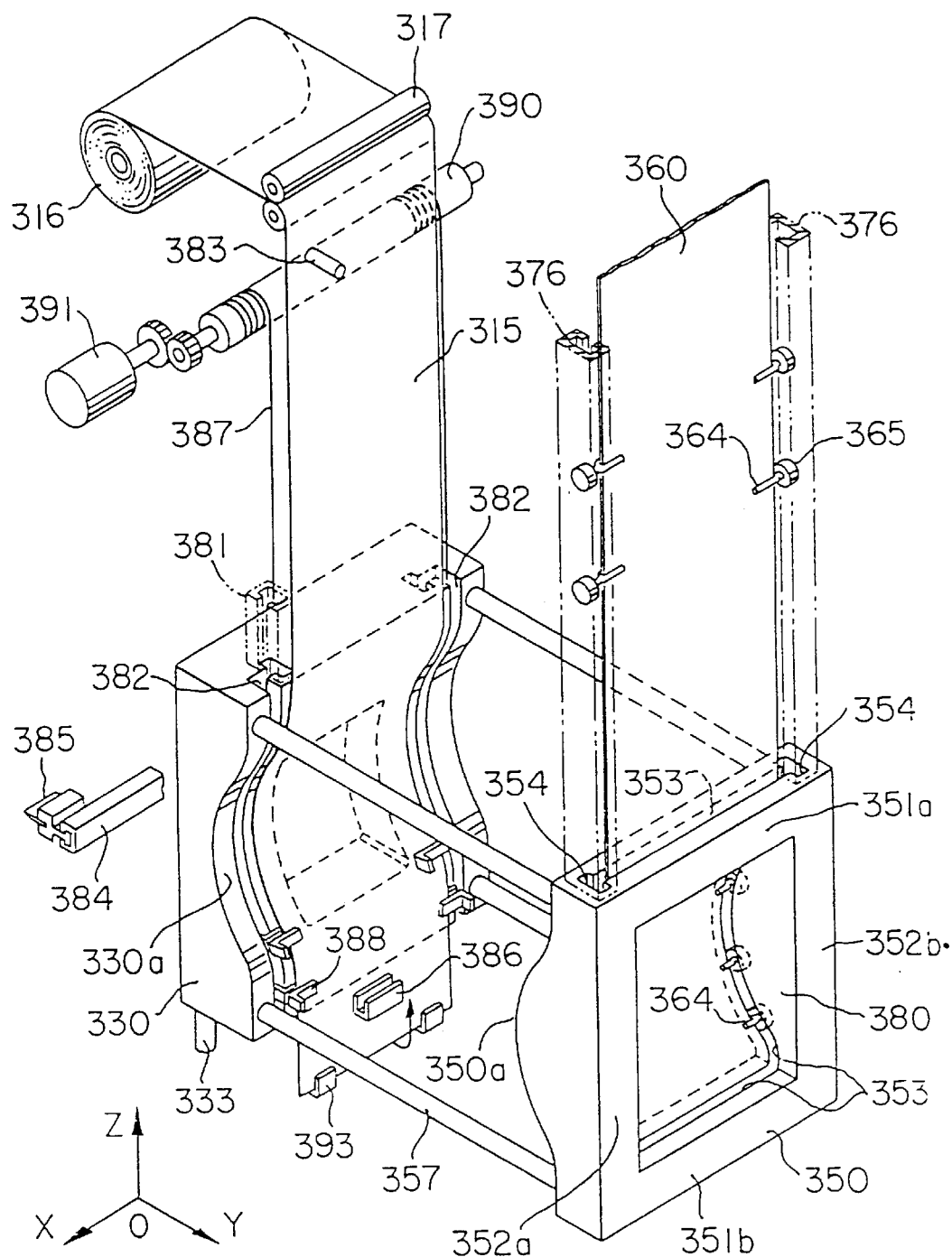
FIG. 33 is an operational drawing of the apparatus for effecting injection-molded-in foil decoration according to the present invention.

Next, as shown in FIG. 33, the position sensor 383 detects that the decoration sheet 315 reaches the predetermined position and the pulling operation by the pulling chuck 386 stops. Thereafter, the pulling chuck 386 is withdrawn from the decoration sheet 315 and instead thereof, the tip end of the decoration sheet 315 is clamped by fixing chucks 393. The pulling chuck 386 away from the decoration sheet 315 is raised thereafter to reach the standby position above the female die 330.

Figure 34:
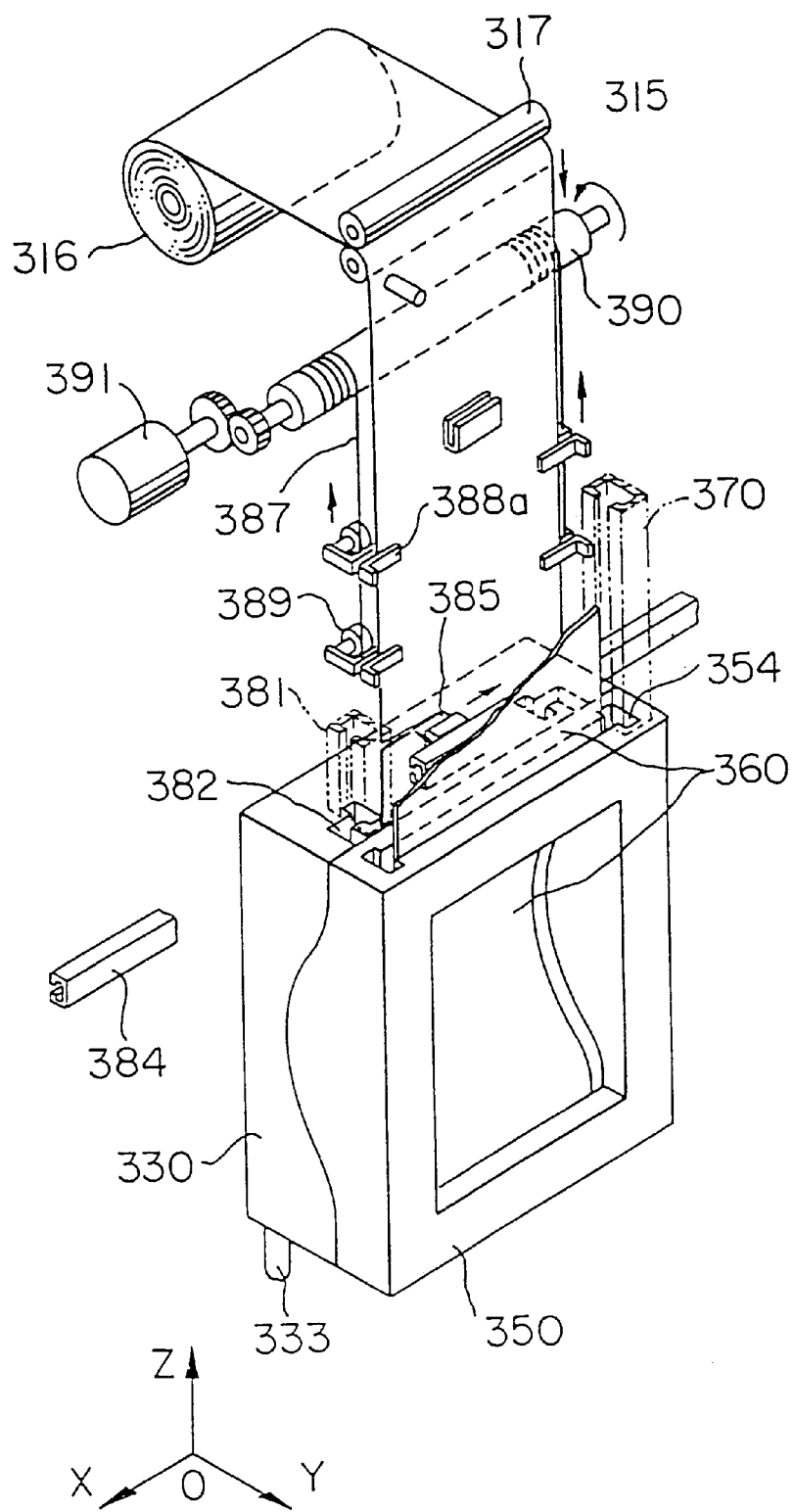
FIG. 34 is an operational drawing of the apparatus for effecting injection-molded-in foil decoration according to the present invention.
Figure 35:
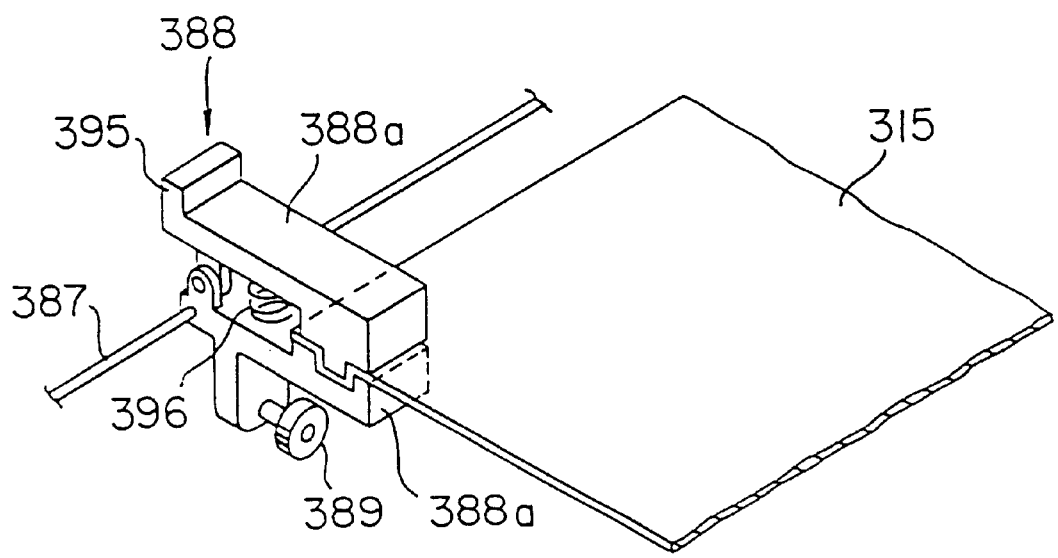
FIG. 35 is a perspective view to show sheet pinching means.
Figure 39:
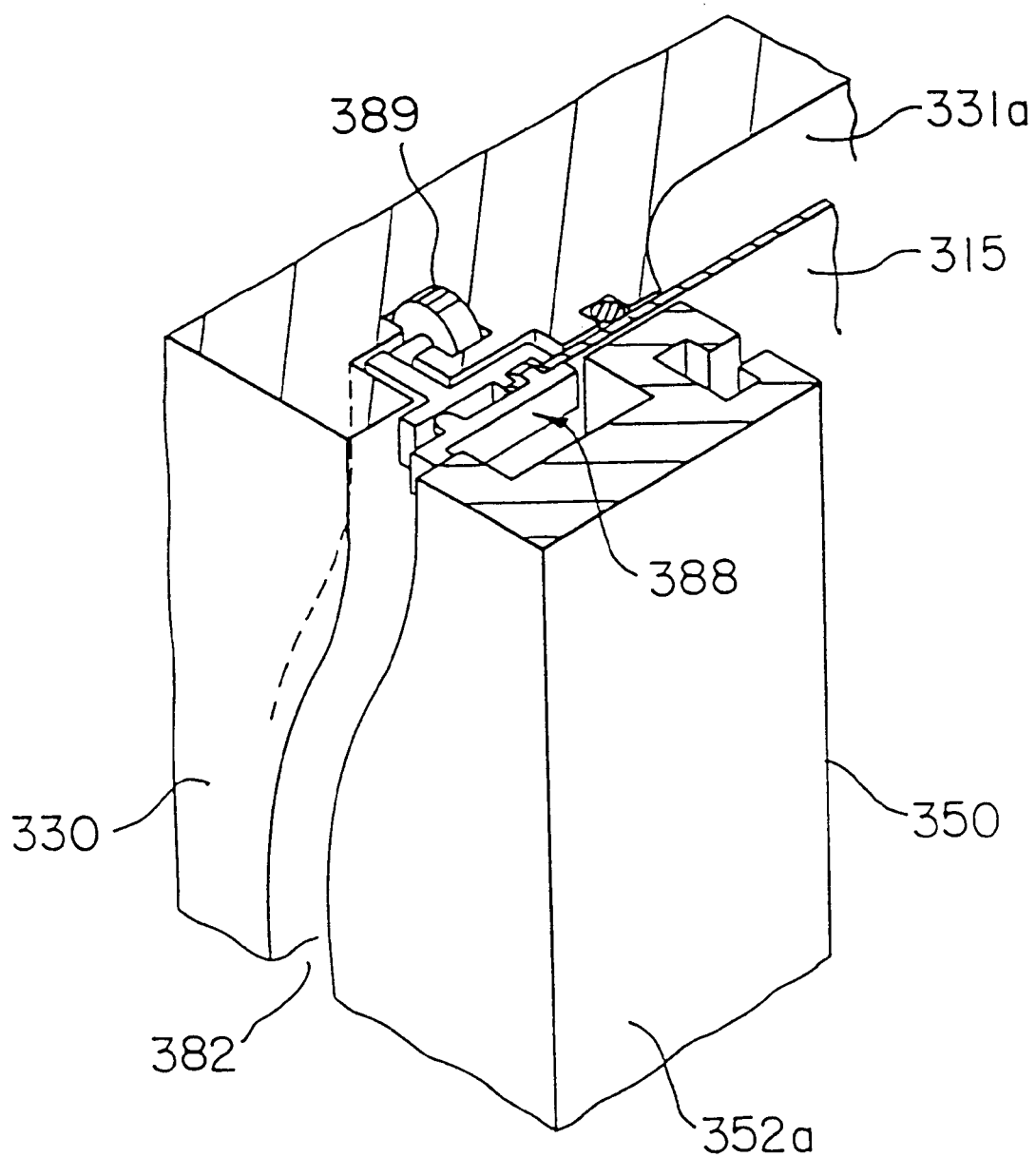
FIG. 39 is a perspective view to show such a state that the female die is in contact with the sheet clamp.

Then, as shown in FIG. 34 and FIG. 39, the slide rods 357 are withdrawn toward the female die 330 (in the y direction). After the sheet clamp 350 moves to the female die 330 thereby, it comes to fit into close contact with the female die 330, whereby the decoration sheet 315 is retained between the sheet clamp 350 and the female die 330. In this case, the sheet clamp 350 is in close contact with the O ring 392 of the female die 330 with the decoration sheet 315 inbetween to seal the cavity 331 of the female die 330.

Figure 36:
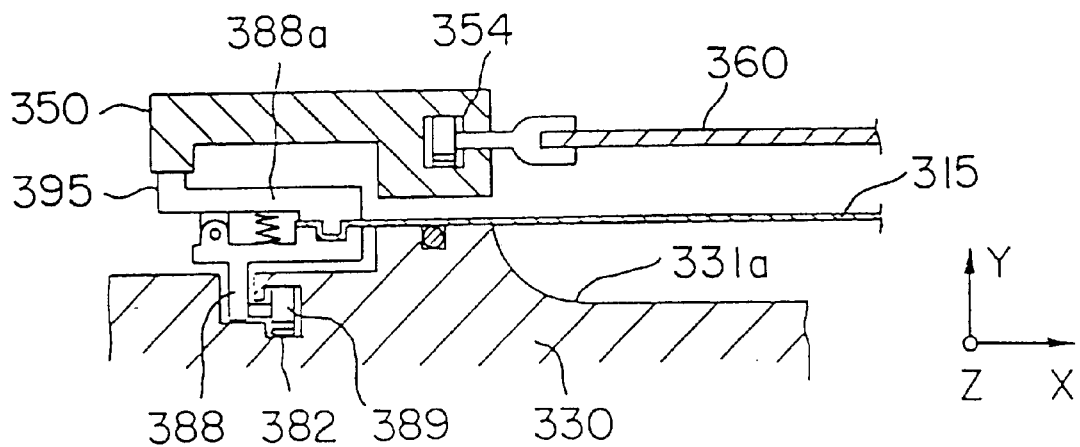
FIG. 36 is a sectional view to show the operation of the sheet pinching means.

During this period, the pair of pinching members 388a, 388a of the sheet pinching means 388 remain pinching the decoration sheet 315 as shown in FIG. 36. Further, the sheet clamp 350 is in close contact with the female die 330 and the decoration sheet 315 is retained between the female die 330 and the sheet clamp 350, whereby the sheet heating body 360 in the sheet clamp 350 can be located with a certain gap relative to the decoration sheet 315.

Figure 37:
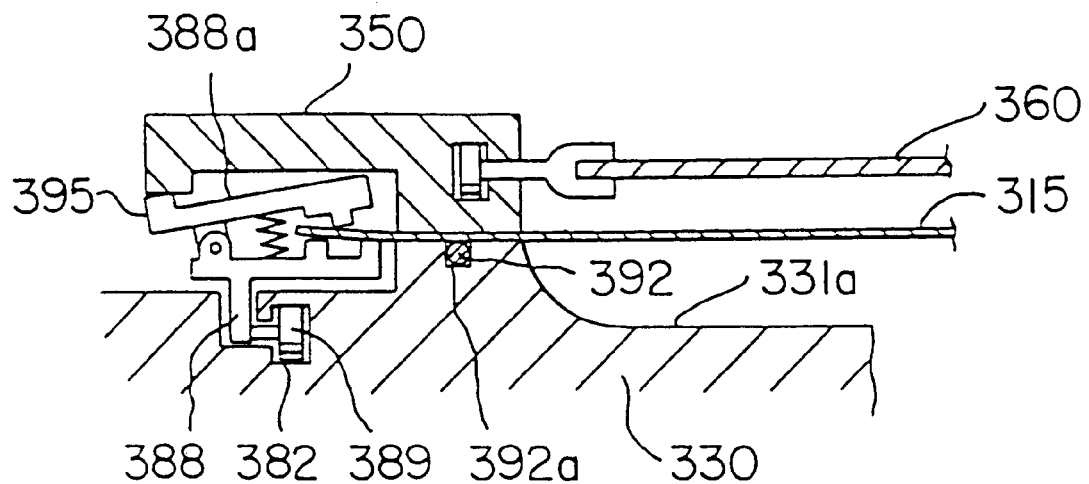
FIG. 37 is a sectional view to show the operation of the sheet pinching means.

Next, as shown in FIG. 37, the driving means drives the projection 395 to open the pair of pinching members 388a, 388a of the sheet pinching means 388, thereby releasing the decoration sheet 315 from the sheet pinching means 388. Then, the wires 387 are wound by the sheet pinching means feed roll 390 to raise the sheet pinching means 388 along the sheet guide grooves 382 of the female die 330 and the sheet guide rails 381, and wait at the standby position above the female die 330. Accordingly, the sheet pinching means 388 is withdrawn in this manner from the sheet guide grooves 382 of the female die 330 (see FIG. 38).

Thereafter, the sheet cutter 385 runs in the widthwise direction of the decoration sheet 315 along the cutter guide rail 384, whereby the decoration sheet 315 is cut by the sheet cutter 385. The running of the sheet cutter 385 is realized, for example, by a rack and pinion mechanism or an air cylinder. The reason why the decoration sheet 315 is cut as above is to prevent deformation or silica appearing in premolding of the decoration sheet 315 and injection molding from affecting or deforming the decoration sheet 315 used for the next molding.

Figure 40:
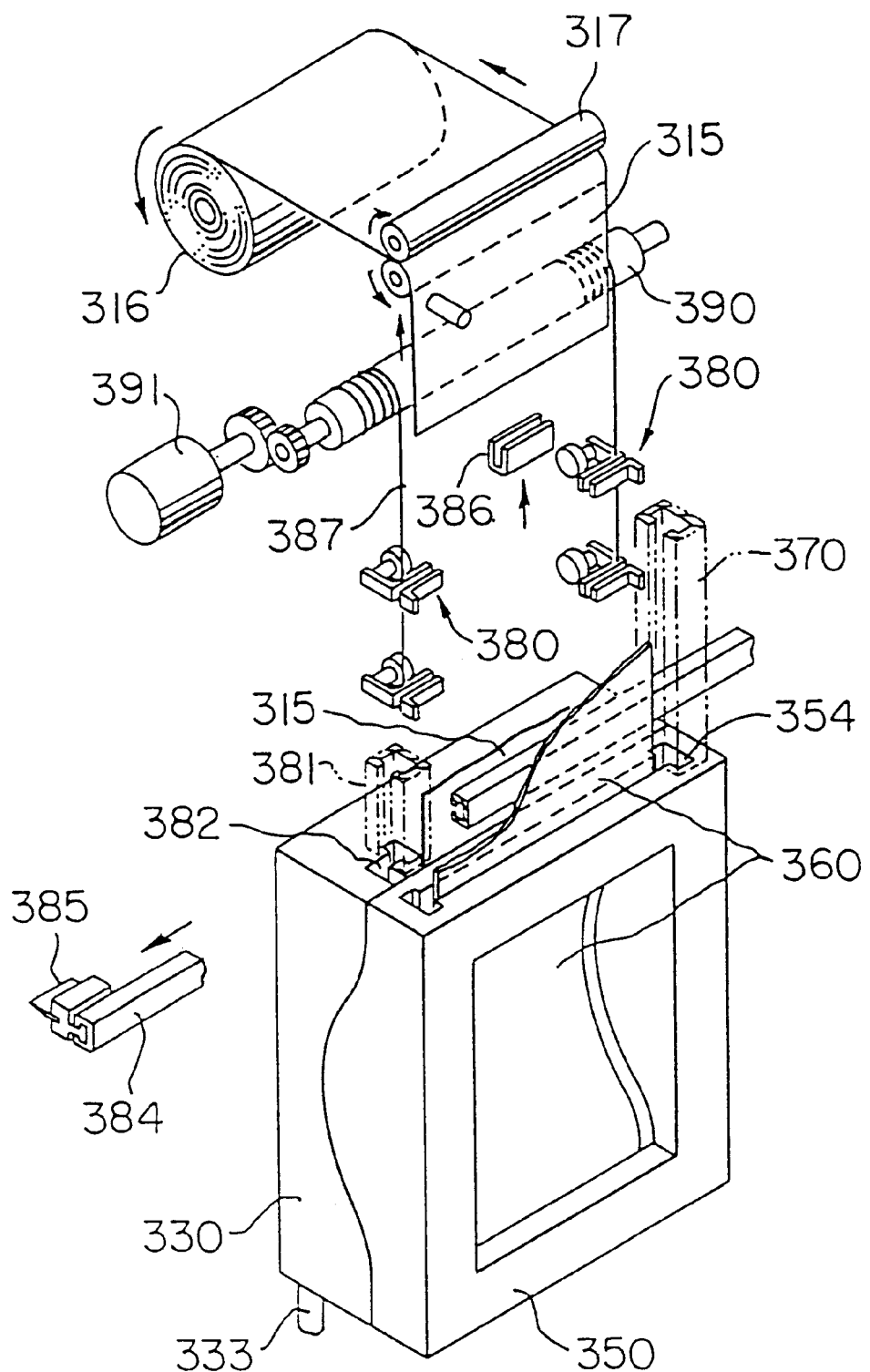
FIG. 40 is a perspective view to show such a state that the decoration sheet is heated by the sheet heating body.

Then, as shown in FIG. 40, the decoration sheet 315 is returned to the standby position by winding the sheet feed roll 316 and the tip of the decoration sheet 315 is pinched by the pulling chuck 386 (see FIG. 30).

Figure 41:
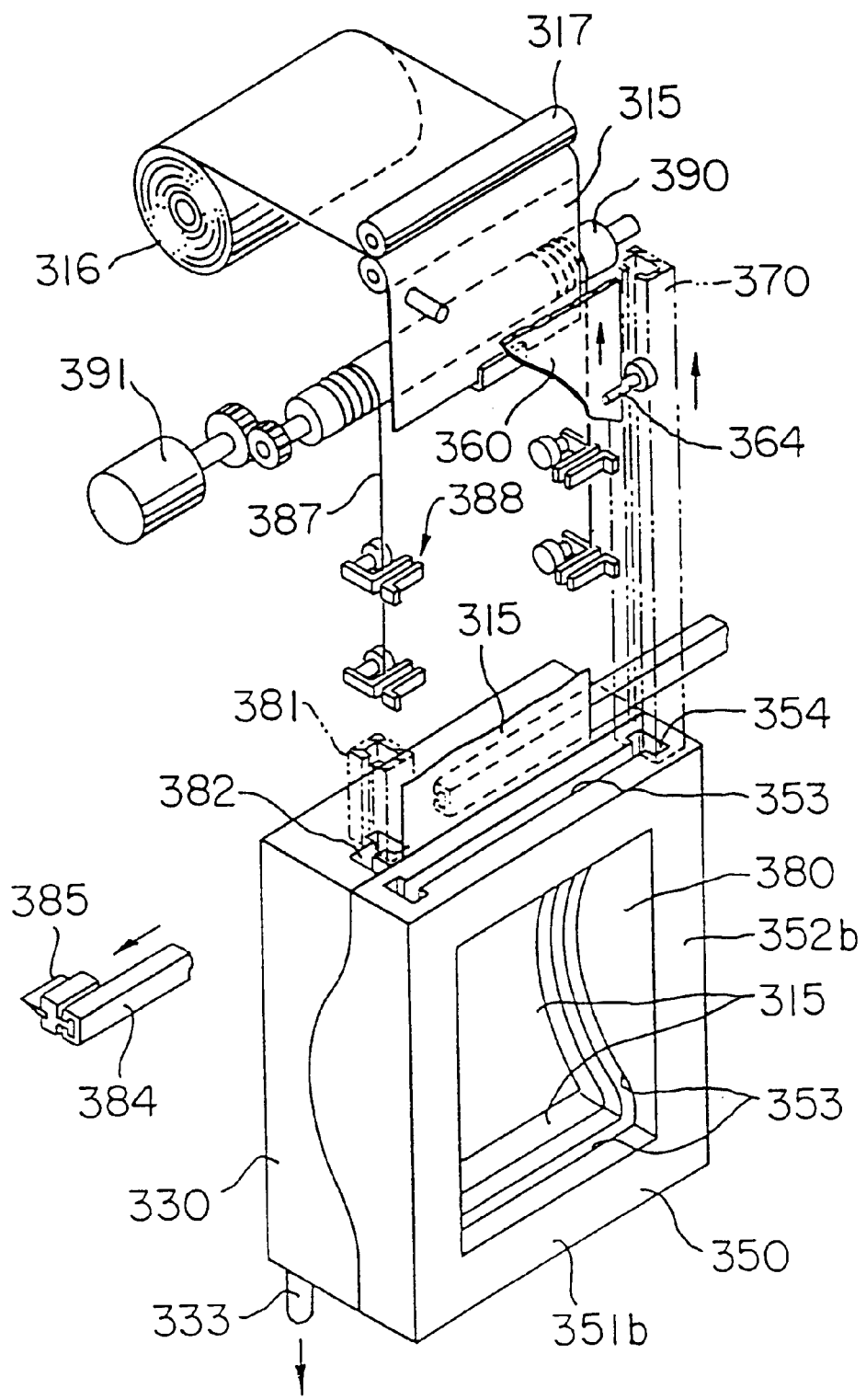
FIG. 41 is a perspective view to show such a state that the sheet heating body is pulled up from the sheet clamp.

During the above operation, the decoration sheet 315 is uniformly heated and softened by the sheet heating body 360 in the sheet clamp 350. This heating is performed mainly by radiation heat in a non-contact manner. After completion of the heating to soften the decoration sheet 315, the sheet heating body 360 is pulled up from inside the sheet clamp 350, as shown in FIG. 41. Then the sheet heating body 360 waits above the sheet clamp 350.

Next, suction is effected from the suction ports 332 of the cavity surface 331a through the suction tube 333 of the female die 330 by the unrepresented vacuum pump, and the softened decoration sheet 315 comes to adhere to the cavity surface 331a to effect premolding.

Figure 42:
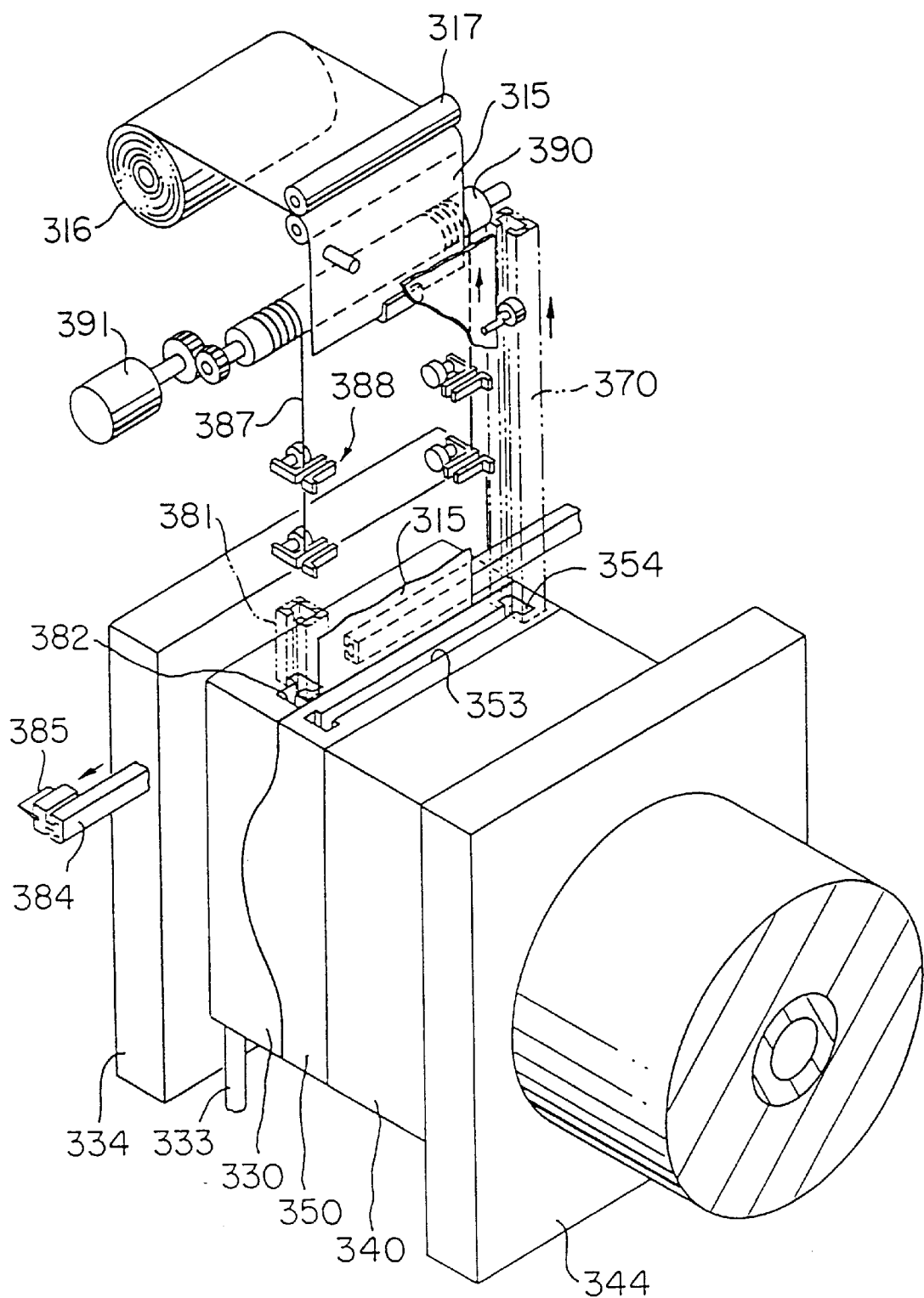
FIG. 42 is a perspective view to show such a state that the female die, the sheet clamp, and the male die are clamped.

Next, as shown in FIG. 42, the female die 330 fixed to the moving platen 334 moves together with the sheet clamp 350 toward the male die 340 fixed to the stationary platen 344, whereby the female die 330, sheet clamp 350 and male die 340 are coupled to achieve die clamping. At that time, the slit 353 and the guide grooves 354 of the sheet clamp 350 are sealed by the core 342 of the male die 340. Next, an injecting resin is poured through the resin pouring port 327 of the male die 340 into the cavity 331 between the female die 330 and the male die 340 through the aperture 380 of the sheet clamp 350, thereby obtaining the molded article Q (see FIG. 7) of the resin thus injected. In this case, a pattern or letters are deposited on the surface of the article Q at the same time as molding thereof.

After that, the slide rods 357 project out to separate the female die 330 from the sheet clamp 350 and the male die 340, thereby effecting die opening among the female die 330, the sheet clamp 350, and male die 340. After the die opening among the female die 330, sheet clamp 350, and male die 340 in this manner, the molded article Q is taken out from the female die 330. In this case, the molded article Q can be easily taken out by pushing the molded article Q with a taking-out rod (not shown) from the female die 330 side or the sheet clamp 350 side.

The flexible sheet heating body 360 is obtained by adhering to a thin elastic steel plate, a sheet heater, such as one formed in such a manner that a heating element constituted for example by spirally winding a fine resistance wire around a glass fiber cord is arranged in a sheet form in accordance with a predetermined pattern, the sheet is set between two thin silicone rubber sheets reinforced with glass fibers, and the resultant is then vulcanized, or a sheet heater formed in such a manner that a coating layer of resistor is formed on a heat resistant resin substrate and the surface is covered by an electrically insulating layer. The heating body has the thickness of about from 0.5 to 2 mm and is arranged to obtain a uniform temperature distribution with supply of an electric current. Shafts 364 are fixed to the both side edges of the flexible sheet heating body 360 throughout a predetermined length from the lower end portion by means of screwing, and rollers 365 are attached as rotatable each to the tips of the shafts 364. The rollers 365 are guided in the guide grooves 376 of sheet heating body guide rails 370, as shown in FIG. 31. Further, guide members which are guided as not rotating but sliding in the guide grooves may be used in place of the rollers 365. A most preferable form of the sheet heating body 360 is a sheet of continuous body having flexibility as a whole. However, in addition thereto, another form applicable may be a body having such a structure that hinges connect heating bodies, each comprised of a rectangular rigid plate elongate in the direction (the widthwise direction) perpendicular to the heater feed direction and short in length in the sheet feed direction.

According to the present embodiment as described above, the pair of guide grooves 382 are formed in the curved grooves 330a on the surface of the female die, and the decoration sheet 315 is curved along the grooves 330a by inserting the sheet pinching means 388 into the sheet guide grooves 382, whereby the decoration sheet 315 can be adhered more smoothly to the cavity surface 331a of the female die 330 in the shape having the level difference smaller than that of the cavity shape and the curvature equal to or smaller than that of the cavity shape. Then premolding is started from this curved state. Because of this, both the deformation amount (stretching amount) and the stretching speed become small in the premolding in which the decoration sheet 315 is adhered to the cavity surface 331a of the female die 330. Accordingly, local stress on the decoration sheet 315 is well dispersed over the entire sheet to be relaxed, as compared with the cases of premolding performed at a stretch from the flat surface to the cavity surface 331a, which makes rare extreme local distortion or breakage of the decoration sheet 315 and which can prevent distortion or deformation of the pattern or the like deposited on the molded article Q.

Figure 43A:
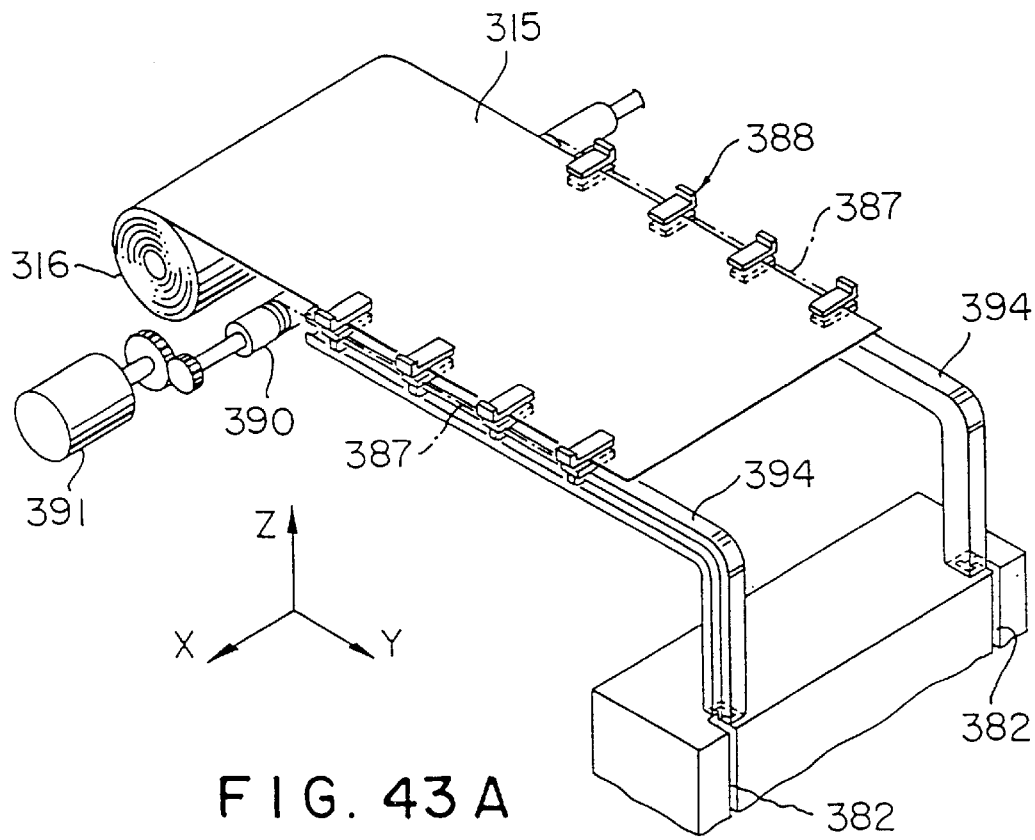
FIG. 43A is a drawing to show a modification of a feed mechanism of the sheet pinching means.
Figure 43B:
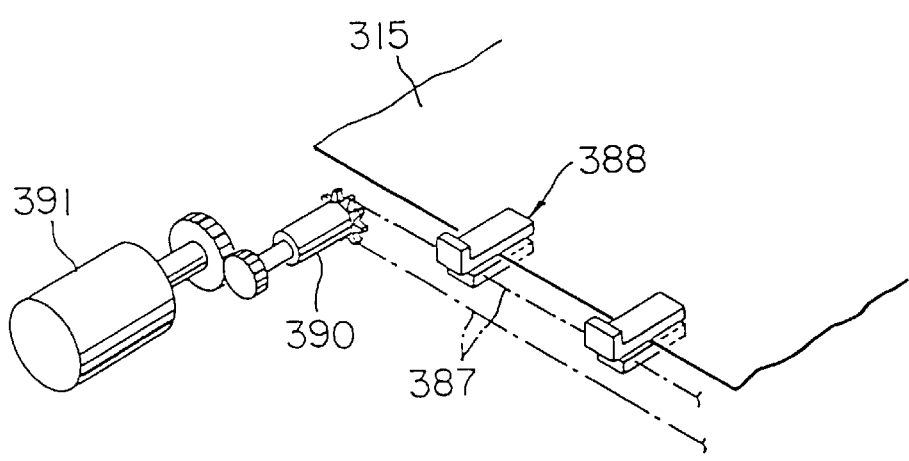
FIG. 43B is a drawing to show the modification of the feed mechanism of the sheet pinching means.
Figure 44:
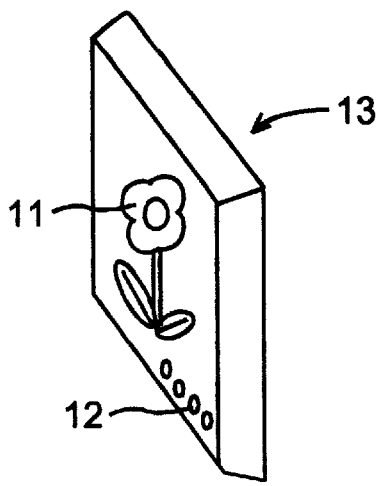
FIG. 44 is a drawing to shown a molded article obtained by the process for effecting injection-molded-in foil decoration.
Figure 45:
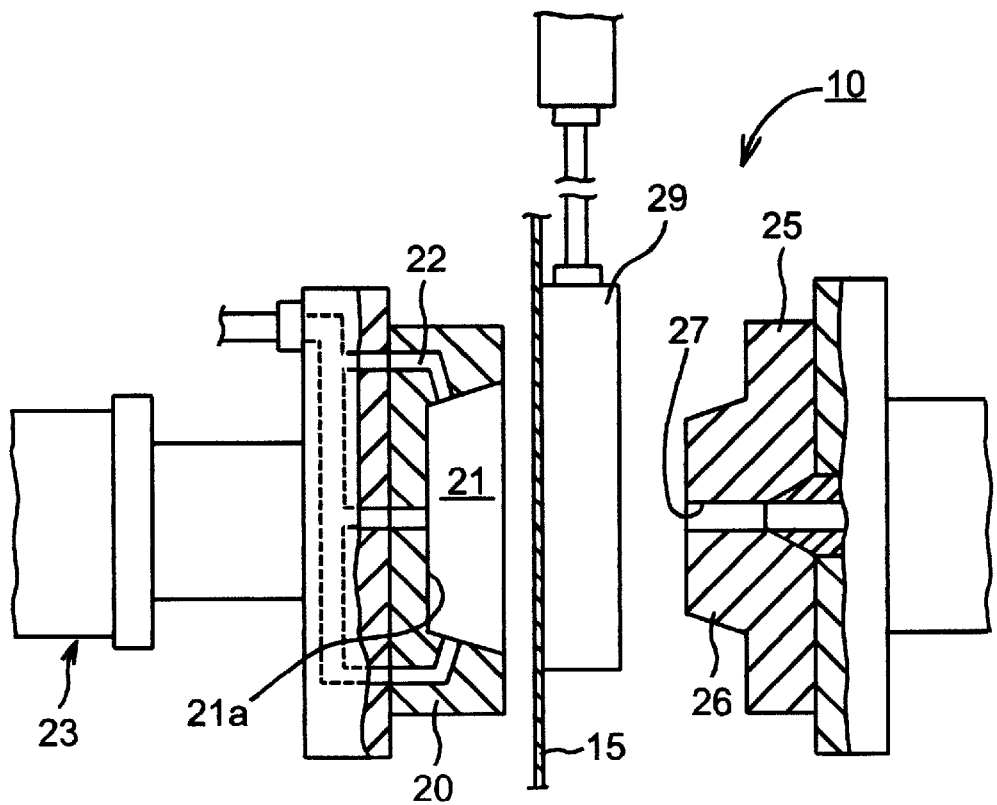
FIG. 45 is an operational drawing of the conventional apparatus for effecting injection-molded-in foil decoration.
Figure 46:
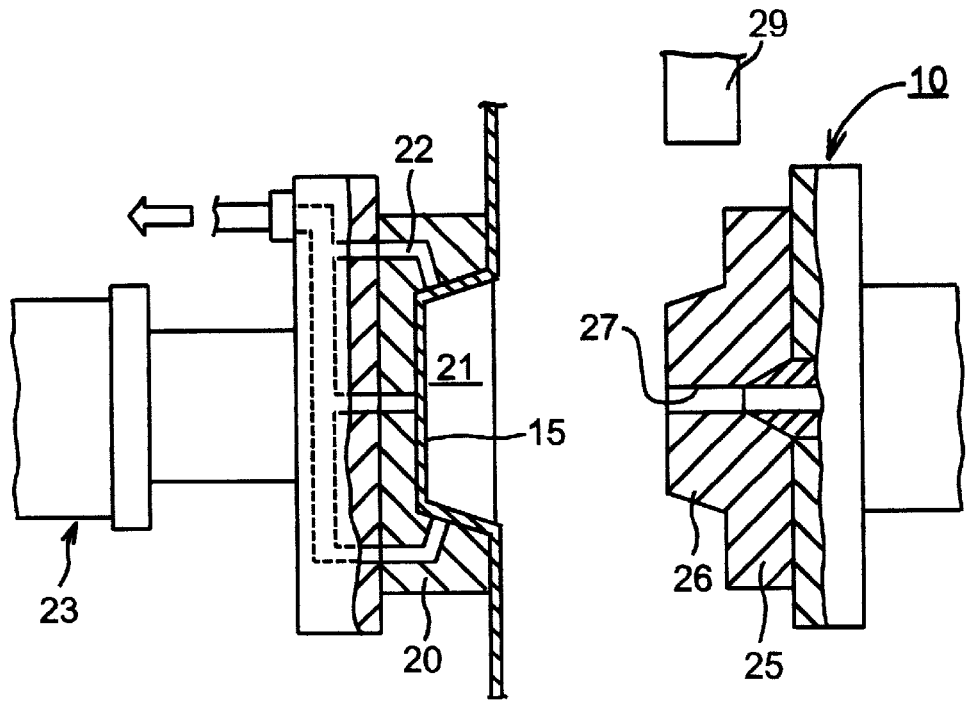
FIG. 46 is an operational drawing of the conventional apparatus for effecting injection-molded-in foil decoration.
Figure 47:
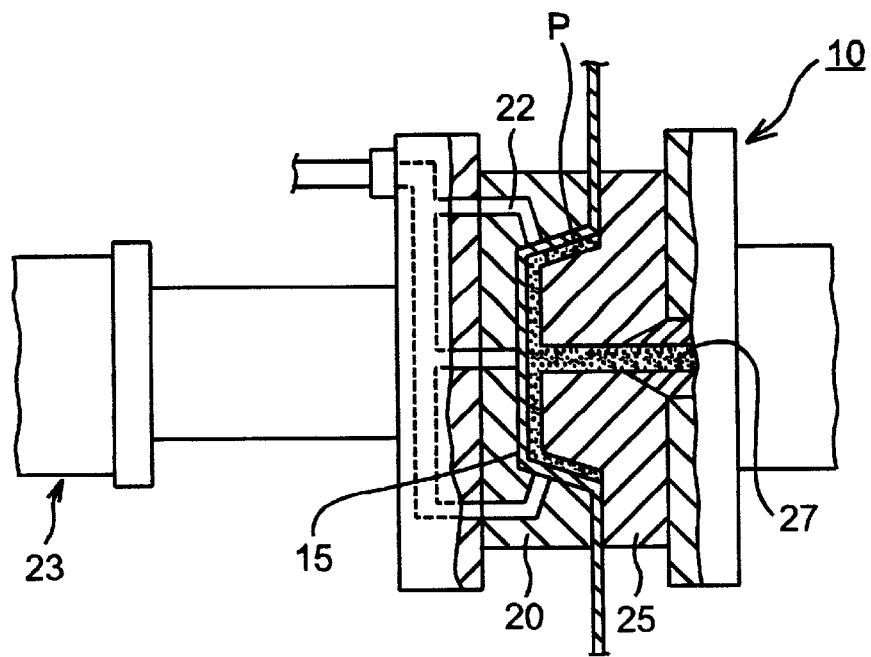
FIG. 47 is an operational drawing of the conventional apparatus for effecting injection-molded-in foil decoration.

Further, the above embodiment showed the example where the sheet pinching means 388 was sent downward in the vertical direction from the sheet pinching means feed roll 390 (see FIG. 30), but, without having to be restricted to this case, it is also conceivable that, as shown in FIG. 43A and FIG. 43B, the sheet pinching means 388 is fed out substantially in the horizontal direction from the sheet pinching means feed roll 390, the sheet pinching means 388 is advanced along bent sheet guide rails 394, and then it is inserted into the sheet guide grooves 382 of the female die 330.

Further, although the embodiment showed the example in which the position sensor 383 for detecting the predetermined position of the decoration sheet 315 was provided, the position sensor 383 may be omitted where the pattern on the decoration sheet 315 does not require positioning. Further, the operation to open and close the pair of pinching members 388a, 388a of the sheet pinching means 388 may also be carried out by attraction and repulsion of an electromagnet.

Further, the embodiment showed the example in which the sheet pinching means 388 was connected to the wires 387, but, without having to be limited to this example, chains may be used instead of the wires 387.

Furthermore, the rollers 389 of the sheet pinching means 388 may be replaced by non-rotating discs, bearings, or the like.

Yet furthermore, the embodiment showed the example where the shapes of the cavity surface 331a and the grooves 330a of the female die 330, and of the projections 350a of the sheet clamp 350 were semicylindrical with the center axis on the x axis (FIG. 30), but they may be semicylindrical with the center axis on the z axis. The shapes of the grooves 330a and the projections 350a may be selected from an elliptic cylinder, a hyperbolic cylinder, etc. as well as a cylinder.

Although the embodiment showed the example where the sheet heating body 360 was inserted into the sheet clamp 350 at the same time as supply of the decoration sheet 315 to the cavity 331 of the female die 330, the sheet heating body 360 may be inserted into the sheet clamp 350 after the decoration sheet 315 is supplied to the cavity 331 of the female die 330 and then the decoration sheet 315 is pinched between the female die 330 and the sheet clamp 350. Further, the decoration sheet 315 used may be either a bonded and layered laminate film or a transfer film. Further, the injection molding method includes, in addition to the method wherein a molten resin is injected and cooled to solidify, the reactive injection molding method wherein a resin solution, which is a liquid at room temperature and which is cured by a chemical reaction, is injected and is cured by the chemical reaction.

According to the present invention, as described above, the decoration sheet 315 can be first curved in a curved state substantially along the cavity surface 331a. Next, after the decoration sheet 315 is heated by the sheet heating body 360 while retaining it relative to the female die 330, the decoration sheet 315 can be smoothly brought into fit to the cavity surface 331a. Namely, premolding is achieved in two steps. Therefore, even though a molding article has the shape with large level difference and curvature of the cavity surface 331a in bringing the decoration sheet 315 into fit to the cavity surface 331a, a high-precision injection molded product can be attained without distortion or breakage of the pattern of the decoration sheet 315.

What is claimed is:

1. A process for effecting injection-molded-in foil decoration, comprising the steps of:

deforming a decoration sheet by a sheet clamp relative to a female die so that the decoration sheet is curved substantially along a surface of a cavity of the female die, but is not in contact with the surface of the cavity of the female die, wherein the sheet clamp has a shape corresponding to that of the cavity surface of the female die;

retaining the decoration sheet curved substantially along the surface of the cavity of the female die, between the sheet clamp and the female die;

then, heating the decoration sheet by a hot platen having a heating surface of substantially the same shape as the decoration sheet retained between the sheet clamp and the female die, while retaining the decoration sheet between the female die and the sheet clamp so that the decoration sheet is curved substantially along the surface of the cavity but is not in contact with the surface of the cavity wherein the retained decoration sheet is softened;

fitting said softened and retained decoration sheet closely to the surface of the cavity of the female die;

coupling the female die having said softened and retained decoration sheet closely fitted thereto with a male die to clamp the dies; and injection molding a molten resin between said softened and retained decoration sheet and the male die, thereby adhering the decoration sheet to an injection molded article.

* * * * *